(12) United States Patent
Pecorini et al.

(10) Patent No.: US 11,976,138 B2
(45) Date of Patent: May 7, 2024

(54) THERMALLY STABLE CELLULOSE ESTER COMPOSITIONS AND ARTICLES MADE USING THESE COMPOSITIONS

(71) Applicant: Eastman Chemical Company, Kingsport, TN (US)

(72) Inventors: Thomas Joseph Pecorini, Kingsport, TN (US); Michael Eugene Donelson, Kingsport, TN (US); Gary Michael Stack, Kingsport, TN (US); Emerson Eston Sharpe, Jr., Kingsport, TN (US); Wenlai Feng, Johnson City, TN (US); Haining An, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 978 days.

(21) Appl. No.: 16/346,910

(22) PCT Filed: Nov. 9, 2017

(86) PCT No.: PCT/US2017/060793
§ 371 (c)(1),
(2) Date: May 2, 2019

(87) PCT Pub. No.: WO2018/089594
PCT Pub. Date: May 17, 2018

(65) Prior Publication Data
US 2019/0256613 A1 Aug. 22, 2019

Related U.S. Application Data

(60) Provisional application No. 62/513,467, filed on Jun. 1, 2017, provisional application No. 62/505,261, filed on May 12, 2017, provisional application No. 62/505,268, filed on May 12, 2017, provisional application No. 62/420,989, filed on Nov. 11, 2016.

(51) Int. Cl.
| | |
|---|---|
| *C08B 3/16* | (2006.01) |
| *B29C 45/00* | (2006.01) |
| *B29K 1/00* | (2006.01) |
| *B29K 105/00* | (2006.01) |
| *C08B 3/06* | (2006.01) |
| *C08K 5/1515* | (2006.01) |
| *C08K 5/526* | (2006.01) |
| *C08L 1/02* | (2006.01) |
| *C08L 1/10* | (2006.01) |
| *C08L 1/12* | (2006.01) |
| *C08L 1/14* | (2006.01) |
| *B29C 45/78* | (2006.01) |
| *C08K 5/00* | (2006.01) |

(52) U.S. Cl.
CPC ............ *C08B 3/16* (2013.01); *B29C 45/0001* (2013.01); *C08B 3/06* (2013.01); *C08K 5/1515* (2013.01); *C08K 5/526* (2013.01); *C08L 1/02* (2013.01); *C08L 1/10* (2013.01); *C08L 1/12* (2013.01); *C08L 1/14* (2013.01); *B29C 45/78* (2013.01); *B29C 2945/76498* (2013.01); *B29C 2945/76531* (2013.01); *B29C 2945/76561* (2013.01); *B29C 2945/76668* (2013.01); *B29K 2001/12* (2013.01); *B29K 2105/0038* (2013.01); *B29K 2995/0017* (2013.01); *B29K 2995/0056* (2013.01); *C08K 5/0016* (2013.01); *C08L 2205/02* (2013.01); *C08L 2205/06* (2013.01)

(58) Field of Classification Search
CPC .... C08B 3/16; C08B 3/18; C08B 3/06; C08B 3/00; C08B 3/22; C08B 3/30; C08B 17/00; C08K 5/005; C08K 5/0016; C08K 5/10; C08K 5/521; C08K 3/32; C08K 5/524; C08K 5/098; C08K 5/1515; C08K 5/526; C08J 5/18; C08J 2301/10; C08J 2301/14; C08J 2301/12; C08J 5/00; C08J 2301/00; C08L 1/14; C08L 1/12; C08L 2666/68; C08L 1/00
USPC ..................................... 106/170.13
See application file for complete search history.

(56) References Cited

U.S. PATENT DOCUMENTS

| | | | |
|---|---|---|---|
| 3,448,173 A | 6/1969 | Ryan et al. | |
| 3,655,825 A | 4/1972 | Souder et al. | |
| 3,853,968 A | 12/1974 | Bortnick et al. | |
| 4,263,183 A | 4/1981 | Light et al. | |
| 4,446,585 A | 5/1984 | Harding et al. | |
| 5,254,630 A * | 10/1993 | Schmidt ................ | C08F 265/04 |
| | | | 525/266 |

(Continued)

FOREIGN PATENT DOCUMENTS

| | | |
|---|---|---|
| CN | 105 504 359 A | 4/2016 |
| IT | MI951 049 A1 | 11/1996 |

(Continued)

OTHER PUBLICATIONS

Toronto Research Chemicals: A697505 [online], [retrieved on Mar. 3, 2022. Retrieved from the internet: < URL: https://www.trc-canada.com/product-detail/?A697505 > (Year: 2022).*

(Continued)

*Primary Examiner* — Coris Fung
*Assistant Examiner* — Ritu S Shirali
(74) *Attorney, Agent, or Firm* — Kenrick L. Vidale

(57) ABSTRACT

The present application discloses cellulose ester compositions that are plasticizer free that can be processed at higher temperatures with reduced degradation. The cellulose ester compositions disclosed are useful for the preparation of articles, for example eyeglass frames, automotive parts, and toys.

9 Claims, No Drawings

(56) References Cited

U.S. PATENT DOCUMENTS

| | | | |
|---|---|---|---|
| 5,534,594 | A | 7/1996 | Troy et al. |
| 6,331,580 | B1 | 12/2001 | Molnar |
| 11,230,635 | B2 * | 1/2022 | Feng ............... C08L 1/10 |
| 2007/0093655 | A1 | 4/2007 | Oya |
| 2010/0144971 | A1 | 6/2010 | Babcock et al. |
| 2016/0068665 | A1 * | 3/2016 | Budhavaram ........ C08L 23/12 524/37 |

FOREIGN PATENT DOCUMENTS

| | | | | |
|---|---|---|---|---|
| IT | MI-951049 A1 * | 11/1996 | ............ | C08B 1/00 |
| WO | WO-2005111184 A2 * | 11/2005 | ............ | C08B 3/22 |

OTHER PUBLICATIONS

Machine translation of ITMI 951049 A1 originally published Nov. 1996 to Lomazzi (Year: 1996).*

Spectrum: Camphor [online], [retrieved on Mar. 5, 2022]. Retrieved from the internet: < URL: https://www.spectrumchemical.com/chemical/camphor-etc > (Year: 2022).*

Rohm and Haas: "Paraloid KM-355 Acrylic Impact Modifier for Weatherable Vinyl Building Application"; 2006, URL:https//www.dow.com/assets/attachments/business/pbm/paraloid_km-355/tds/parloid_km-355.pdf.

Shelton, Michael; "Cellulose Esters, Inorganic Esters"; Kirk-Othmer Encyclopedia of Chemical Technology 5th edition, vol. 5; (2004), pp. 394-409.

Gedon, Steven, et al.; "Cellulose Esters, Organic Esters"; Kirk-Othmer Encyclopedia of Chemical Technology 5th edition, vol. 5; (2004)m pp. 412-444.

ASTMD648; "Standard Test Method for Deflection Temperature of Plastics Under Flexural Load in the Edgewise Position"; Apr. 2018.

ASTMD638; "Standard Test Method for Tensile Properties of Plastics"; Mar. 2015.

ASTMD256; "Standard Test Methods for Determining the Izod Pendulum Impact Resistance of Plastics"; Nov. 2018.

ASTMD790; "Standard Test Methods for Flexural Properties of Unreinforced and Reinforced Plastics and Electrical Insulating Materials"; Jul. 2017.

ASTMD3418; "Standard Test Method for Transition Temperatures and Enthalpies of Fusion and Crystallization of Polymers by Differential Scanning Calorimetry"; Jun. 2015.

ASTMD4440; "Standard Test Method for Plastics: Dynamic Mechanical Properties Melt Rheology"; Feb. 2015.

ASTMD5296; "Standard Test Method for Molecular Weight Averages and Molecular Weight Distribution of Polystyrene by High Performance Size-Exclusion Chromatography"; Sep. 2011.

ASTME1348; "Standard Test Method for Transmittance and Color by Spectrophotometry Using Hemispherical Geometry"; Nov. 2015.

Notification of Transmittal of the International Search Report and the Written Opinion of the International Searching Authority, or the Declaration; International Application No. PCT/US2017/060793; International Filing Date of Nov. 9, 2017.

The dow company: "Paraloid Acrylic Impact Modifier Platform for Profiles", 2008 XP002777924, Retrieved from the Internet: URL: https://www.dow.com/assets/attachments/business/pbm/paraloid-km/shared tds/paraloid.pdf; Description, first paragraph.

* cited by examiner

THERMALLY STABLE CELLULOSE ESTER COMPOSITIONS AND ARTICLES MADE USING THESE COMPOSITIONS

CROSS-REFERENCE TO RELATED APPLICATION(S)

This application is a national stage filing under 35 USC § 371 of International Application Number PCT/US2017/060793, filed on Nov. 9, 2017, which claims the benefit of the filing date to U. S. Provisional Application Number 62/420,989 filed on Nov. 11, 2016, 62/505,261 filed on May 12, 2017, 62/505,268 filed on May 12, 2017 and 62/513,467 filed on Jun. 1, 2017 the entire disclosures of which are incorporated by reference herein.

FIELD OF THE INVENTION

This invention relates generally to the field of cellulose ester chemistry. The invention also relates to compositions made from the cellulose esters and articles made therefrom.

BACKGROUND OF THE INVENTION

Commercially available cellulose ester compositions typically have a heat deflection temperature (HDT) of less than 90° C. due to the presence of high levels of plasticizers. The high levels of plasticizers in the cellulose ester compositions enable processing of the cellulose esters and impart a certain level of toughness to molded articles from the compositions. However, the addition of plasticizer has drawbacks that limit the use of the cellulose ester materials for applications that can accommodate an HDT below about 90° C. Also, plasticized cellulose ester molded articles can experience plasticizer exudation during use. To obtain cellulose ester compositions with HDTs of greater than 90° C., the plasticizer can be eliminated or substantially reduced. However, the resulting cellulose compositions require higher processing temperatures which can result in the degradation of cellulose ester compositions resulting in undesirable products. It would be beneficial to be able to provide melt processable cellulose ester compositions that do not have such drawbacks.

SUMMARY OF THE INVENTION

The present application discloses a composition comprising a cellulose ester; and optionally a plasticizer, wherein when the plasticizer is present the plasticizer is present at less than 20 wt % based on the total weight of the composition, wherein the composition has a heat distortion temperature ("HDT") that is in the range of from about 90° C. to about 140° C. according to ASTM D648 as measured at 1.82 MPa using a 3.2 mm thick bar subjected to 70° C. for 4 hours, wherein the change in the absolute weight average molecular weight ("$M_w$") due to injection molding is less than 30%, when the composition is injection molded with a barrel temperature of 260° C. with a residence time of 5 min.

DETAILED DESCRIPTION

Definitions

Antioxidants are chemicals used to interrupt degradation processes during the processing of materials. Antioxidants are classified into several classes, including primary antioxidant, and secondary antioxidant.

"Primary antioxidants" are antioxidants that act by reacting with peroxide radicals via a hydrogen transfer to quench the radicals. Primary antioxidants generally contain reactive hydroxy or amino groups such as in hindered phenols and secondary aromatic amines. Examples of primary antioxidants include Irganox™ 1010, 1076, 1726, 245, 1098, 259, and 1425; Ethanox™ 310, 376, 314, and 330; Evernox™ 10, 76, 1335, 1330, 3114, MD 1024, 1098, 1726, 120. 2246, and 565; Anox™ 20, 29, 330, 70, IC-14, and 1315; Lowinox™ 520, 1790, 221646, 22M46, 44625, AH25, GP45, CA22, CPL, HD98, TBM-6, and WSP; Naugard™ 431, PS48, SP, and 445; Songnox™ 1010, 1024, 1035, 1076 CP, 1135 LQ, 1290 PW, 1330FF, 1330PW, 2590 PW, and 3114 FF; and ADK Stab AO-20, AO-30, AO-40, AO-50, AO-60, AO-80, and AO-330.

"Secondary antioxidants" are often called hydroperoxide decomposers. They act by reacting with hydroperoxides to decompose them into nonreactive and thermally stable products that are not radicals. They are often used in conjunction with primary antioxidants. Examples of secondary antioxidants include the organophosphorous (e.g., phosphites, phosphonites) and organosulfur classes of compounds. The phosphorous and sulfur atoms of these compounds react with peroxides to convert the peroxides into alcohols. Examples of secondary antioxidants include Ultranox 626, Ethanox™ 368, 326, and 327; Doverphos™ LPG11, LPG12, DP S-680, 4, 10, S480, and S-9228; Evernox™ 168 and 626; Irgafos™ 126 and 168; Weston™ DPDP, DPP, EHDP, PDDP, TDP, TLP, and TPP; Mark™ CH 302, CH 55, TNPP, CH66, CH 300, CH 301, CH 302, CH 304, and CH 305; ADK Stab 2112, HP-10, PEP-8, PEP-36, 1178, 135A, 1500, 3010, C, and TPP; Weston 439, DHOP, DPDP, DPP, DPTDP, EHDP, PDDP, PNPG, PTP, PTP, TDP, TLP, TPP, 398, 399, 430, 705, 705T, TLTTP, and TNPP; Alkanox 240, 626, 626A, 627AV, 618F, and 619F; and Songnox™ 1680 FF, 1680 PW, and 6280 FF.

"Acid scavengers" are additives that neutralize acids formed during the processing of polymers. Examples of acid scavengers include Hycite 713; Kisuma DHT-4A, DHT-4V, DHT-4A-2, DHT-4C, ZHT-4V, and KW2200; Brueggemann Chemical Zinc Carbonate RAC; Sipax™ AC-207; calcium stearate; Baerlocher GL 34, RSN, GP, and LA Veg; Licomont CAV 102; FACI Calcium Stearate DW, PLC, SP, and WLC; Hangzhou Hitech Fine Chemical: CAST, and ZnST; Songstab™ SC-110, SC-120, SC-130, SM-310, and SZ-210; Sun Ace SAK-CS, SAK-DSC, SAK-DMS, SAK-DZS, and SAK-KS; US Zinc Zinc Oxide 201, 205 HAS, 205H, 210, and 210E; Drapex™ 4.4, 6.8, 39, 391, 392, and 392S; Vikoflex™ 4050, 5075, 7170, 7190, 7040, 9010, 9040, and 9080; Joncryl™ ADR 4468, and ADR 4400; Adeka CIZER D-32; Epon™ 1001F, 1002F, and 1007F; Aralidite™ ECN 1299, 1273, 1280, 1299, and 9511; Dynamar RC 5251Q; and Nexamite PBO.

As used herein the term "chosen from" when used with "and" or "or" have the following meanings: A variable chosen from A, B and C means that the variable can be A alone, B alone, or C alone. A variable A, B, or C means that the variable can be A alone, B alone, C alone, A and B in combination, A and C in combination, or A, B, and C in combination.

Compositions

The present application discloses a composition comprising a cellulose ester; and optionally a plasticizer, wherein when the plasticizer is present the plasticizer is present at less than 20 wt % based on the total weight of the composition, wherein the composition has a heat distortion temperature that is in the range of from about 90° C. to about 140° C. according to ASTM D648 as measured at 1.82 MPa using a 3.2 mm thick bar subjected to 70° C. for 4 hours, wherein the change in the absolute weight average molecular weight ("$M_w$") due to injection molding is less than 30%, when the composition is injection molded with a barrel temperature of 260° C. with a residence time of 5 min.

In one embodiment, the composition has a HDT is in the range of from about 95° C. to about 130° C. according to ASTM D648 as measured at 1.82 MPa using a 3.2 mm thick bar subjected to 70° C. for 4 hours. In one class of this embodiment, when the composition is injection molded with a barrel temperature of 260° C. with a residence time of 5 min, the change in the $M_w$ is less than 25%. In one subclass of this class, the ΔE value is less than 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one class of this embodiment, the change in the absolute weight average molecular weight ("$M_w$") due to injection molding is less than 20%, when the composition is injection molded with a barrel temperature of 260° C. with a residence time of 5 min. In one subclass of this class, the ΔE value is less than 25, wherein ΔE is determined by the following equation:

$$((L^*-100)^2+(a^*-^0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one class of this embodiment, when the composition is injection molded with a barrel temperature of 260° C. with a residence time of 5 min, the change in the $M_w$ is less than 15%. In one subclass of this class, the ΔE value is less than 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one embodiment, the composition has a HDT is in the range of from about 100° C. to about 130° C. according to ASTM D648 as measured at 1.82 MPa using a 3.2 mm thick bar subjected to 70° C. for 4 hours. In one class of this embodiment, when the composition is injection molded with a barrel temperature of 260° C. with a residence time of 5 min, the change in the $M_w$ is less than 25%. In one subclass of this class, the LE value is less than 25 wherein LE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one class of this embodiment, when the composition is injection molded with a barrel temperature of 260° C. with a residence time of 5 min, the change in the $M_w$ is less than 20%. In one subclass of this class, the LE value is less than 25 wherein LE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one class of this embodiment, when the composition is injection molded with a barrel temperature of 260° C. with a residence time of 5 min, the change in the $M_w$ is less than 15%. In one subclass of this class, the ΔE value is less than 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one embodiment, the composition has a HDT is in the range of from about 95° C. to about 110° C. according to ASTM D648 as measured at 1.82 MPa using a 3.2 mm thick bar subjected to 70° C. for 4 hours. In one class of this embodiment, when the composition is injection molded with a barrel temperature of 260° C. with a residence time of 5 min, the change in the $M_w$ is less than 25%. In one subclass of this class, the LE value is less than 25 wherein LE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, the composition has a notched izod impact strength in the range of from about 80 J/m to about 500 J/m as measured according to ASTM D256 using a 3.2 mm thick bar that has been subjected to 50% relative humidity for 48 hours at 23° C. In one sub-subclass of this subclass, the composition has a notched izod impact strength in the range of from about 80 J/m to about 400 J/m as measured according to ASTM D256 using a 3.2 mm thick bar that has been subjected to 50% relative humidity for 48 hours at 23° C. In one sub-subclass of this subclass, the composition has a notched izod impact strength in the range of from about 80 J/m to about 300 J/m as measured according to ASTM D256 using a 3.2 mm thick bar that has been subjected to 50% relative humidity for 48 hours at 23° C. In one sub-subclass of this subclass, the composition has a notched izod impact strength in the range of from about 80 J/m to about 200 J/m as measured according to ASTM D256 using a 3.2 mm thick bar that has been subjected to 50% relative humidity for 48 hours at 23° C.

In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one class of this embodiment, when the composition is injection molded with a barrel temperature of 260° C. with a residence time of 5 min, the change in the $M_w$ is less than 20%. In one subclass of this class, the ΔE value is less than 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one class of this embodiment, when the composition is injection molded with a barrel temperature of 260° C. with a residence time of 5 min, the change in the $M_w$ is less than 15%. In one subclass of this class, the LE value is less than 25 wherein LE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one sub-subclass of this subclass, cellulose ester has an absolute weight average molecular weight in the range of from about 40,000 Da to about 200,000 Da measured according to ASTM D5296 using tetrahydrofuran as a solvent and a flow rate of 1 mL/min. In one sub-subclass of this subclass, cellulose ester has an absolute weight average molecular weight in the range of from about 50,000 Da to about 150,000 Da measured according to ASTM D5296 using tetrahydrofuran as a solvent and a flow rate of 1 mL/min. In one sub-subclass of this subclass, cellulose ester has an absolute weight average molecular weight in the range of from about 75,000 Da to about 100,000 Da measured according to ASTM D5296 using tetrahydrofuran as a solvent and a flow rate of 1 mL/min.

In one embodiment, the composition has a HDT is in the range of from about 120° C. to about 130° C. according to ASTM D648 as measured at 1.82 MPa using a 3.2 mm thick bar subjected to 70° C. for 4 hours. In one embodiment, the composition has a HDT is in the range of from about 90° C. to about 110° C. according to ASTM D648 as measured at 1.82 MPa using a 3.2 mm thick subjected to 70° C. for 4 hours. In one embodiment, the composition has a HDT is in the range of from about 100° C. to about 110° C. according to ASTM D648 as measured at 1.82 MPa using a 3.2 mm thick bar subjected to 70° C. for 4 hours. In one embodiment, the composition has a HDT is in the range of from about 105° C. to about 110° C. according to ASTM D648 as measured at 1.82 MPa using a 3.2 mm thick bar subjected to 70° C. for 4 hours. In one embodiment, the composition has a HDT is greater than 95° C. according to ASTM D648 as measured at 1.82 MPa using a 3.2 mm thick bar subjected to 70° C. for 4 hours. In one embodiment, the composition has a HDT is greater than 100° C. according to ASTM D648 as measured at 1.82 MPa using a 3.2 mm thick bar subjected to 70° C. for 4 hours. In one embodiment, the composition has a HDT is greater than 105° C. according to ASTM D648 as measured at 1.82 MPa using a 3.2 mm thick bar subjected to 70° C. for 4 hours. In one embodiment, the composition has a HDT is greater than 110° C. according to ASTM D648 as measured at 1.82 MPa using a 3.2 mm thick bar subjected to 70° C. for 4 hours.

In one embodiment, the b* value is less than 15 measured according to ASTM E1348 using a 3.2 mm plaque made from the composition which has been injection molded with a barrel temperature of 249° C. with a residence time of 5 min. In one embodiment, the b* value is less than 12 measured according to ASTM E1348 using a 3.2 mm plaque made from the composition which has been injection molded with a barrel temperature of 249° C. with a residence time of 5 min. In one embodiment, the b* value is less than 10 measured according to ASTM E1348 using a 3.2 mm plaque made from the composition which has been injection molded with a barrel temperature of 249° C. with a residence time of 5 min. In one embodiment, the b* value is less than 8 measured according to ASTM E1348 using a 3.2 mm plaque made from the composition which has been injection molded with a barrel temperature of 249° C. with a residence time of 5 min. In one embodiment, the b* value is less than 7 measured according to ASTM E1348 using a 3.2 mm plaque made from the composition which has been injection molded with a barrel temperature of 249° C. with a residence time of 5 min. In one embodiment, the b* value is less than 6 measured according to ASTM E1348 using a 3.2 mm plaque made from the composition which has been injection molded with a barrel temperature of 249° C. with a residence time of 5 min. In one embodiment, the b* value is less than 5 measured according to ASTM E1348 using a 3.2 mm plaque made from the composition which has been injection molded with a barrel temperature of 249° C. with a residence time of 5 min. In one embodiment, the b* value is less than 4 measured according to ASTM E1348 using a 3.2 mm plaque made from the composition which has been injection molded with a barrel temperature of 249° C. with a residence time of 5 min. In one embodiment, the b* value is less than 3 measured according to ASTM E1348 using a 3.2 mm plaque made from the composition which has been injection molded with a barrel temperature of 249° C. with a residence time of 5 min. In one embodiment, the b* value is in the range of from about 0 to about 15 measured according to ASTM E1348 using a 3.2 mm plaque made from the composition which has been injection molded with a barrel temperature of 249° C. with a residence time of 5 min.

In one embodiment, the L* value is greater than 80 measured according to ASTM E1348 using a 3.2 mm plaque made from the composition which has been injection molded with a barrel temperature of 249° C. with a residence time of 5 min. In one embodiment, the L* value is greater than 85 measured according to ASTM E1348 using a 3.2 mm plaque made from the composition which has been injection molded with a barrel temperature of 249° C. with a residence time of 5 min. In one embodiment, the L* value is greater than 90 measured according to ASTM E1348 using a 3.2 mm plaque made from the composition which has been injection molded with a barrel temperature of 249° C. with a residence time of 5 min. In one embodiment, the L* value is in the range of from about 80 to about 99 measured according to ASTM E1348 using a 3.2 mm plaque made from the composition which has been injection molded with a barrel temperature of 249° C. with a residence time of 5 min. In one embodiment, the L* value is in the range of from about 80 to about 96 measured according to ASTM E1348 using a 3.2 mm plaque made from the composition which has been injection molded with a barrel temperature of 249° C. with a residence time of 5 min. In one embodiment, the L* value is in the range of from about 80 to about 95 measured according to ASTM E1348 using a 3.2 mm plaque made from the composition which has been injection molded with a barrel temperature of 249° C. with a residence time of 5 min. In one embodiment, the L* value is in the range of from about 85 to about 96 measured according to ASTM E1348 using a 3.2 mm plaque made from the composition which has been injection molded with a barrel temperature of 249° C. with a residence time of 5 min. In one embodiment, the L* value is in the range of from about 90 to about 96 measured according to ASTM E1348 using a 3.2 mm plaque made from the composition which has been injection molded with a barrel temperature of 249° C. with a residence time of 5 min.

In one embodiment, the LE value is less than 25 wherein LE is determined by the following equation:

$$((L*-100)^2+(a*-0)^2+(b*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the LE value is less than 20 wherein LE is determined by the following equation:

$$((L*-100)^2+(a*-0)^2+(b*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the ΔE value is less than 15 wherein ΔE is determined by the following equation:

$$((L*-100)^2+(a*-0)^2+(b*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the ΔE value is less than 10 wherein ΔE is determined by the following equation:

$$((L*-100)^2+(a*-0)^2+(b*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the ΔE value is less than 8 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the ΔE value is in the range of from about 2 to about 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the ΔE value is in the range of from about 3 to about 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the ΔE value is in the range of from about 4 to about 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the ΔE value is in the range of from about 2 to about 10 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min. In one embodiment, the ΔE value is in the range of from about 10 to about 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min.

In one embodiment, the cellulose ester has an absolute weight average molecular weight in the range of from about 40,000 Da to about 200,000 Da measured according to ASTM D5296 using tetrahydrofuran as a solvent and a flow rate of 1 mL/min. In one embodiment, the cellulose ester has an absolute weight average molecular weight in the range of from about 50,000 Da to about 150,000 Da measured according to ASTM D5296 using tetrahydrofuran as a solvent and a flow rate of 1 mL/min. In one embodiment, the cellulose ester has an absolute weight average molecular weight in the range of from about 75,000 Da to about 100,000 Da measured according to ASTM D5296 using tetrahydrofuran as a solvent and a flow rate of 1 mL/min. In one embodiment, the cellulose ester has an absolute weight average molecular weight in the range of from about 40,000 Da to 75,000 Da measured according to ASTM D5296 using tetrahydrofuran as a solvent and a flow rate of 1 mL/min. In one embodiment, the cellulose ester has an absolute weight average molecular weight in the range of from about 100,000 Da to 150,000 Da measured according to ASTM D5296 using tetrahydrofuran as a solvent and a flow rate of 1 mL/min. In one embodiment, the cellulose ester has an absolute weight average molecular weight in the range of from about 150,000 Da to 200,000 Da measured according to ASTM D5296 using tetrahydrofuran as a solvent and a flow rate of 1 mL/min. In one embodiment, the cellulose ester has an absolute weight average molecular weight in the range of from about 60,000 Da to 170,000 Da measured according to ASTM D5296 using tetrahydrofuran as a solvent and a flow rate of 1 mL/min. In one embodiment, the cellulose ester has an absolute weight average molecular weight in the range of from about 600,000 Da to 90,000 Da measured according to ASTM D5296 using tetrahydrofuran as a solvent and a flow rate of 1 mL/min. In one embodiment, the cellulose ester has an absolute weight average molecular weight in the range of from about 120,000 Da to 170,000 Da measured according to ASTM D5296 using tetrahydrofuran as a solvent and a flow rate of 1 mL/min.

In one embodiment, the change in the absolute weight average molecular weight ("$M_w$") due to injection molding is less than 25%, when the composition is injection molded with a barrel temperature of 260° C. with a residence time of 5 min. In one embodiment, the change in the absolute weight average molecular weight ("$M_w$") due to injection molding is less than 20%, when the composition is injection molded with a barrel temperature of 260° C. with a residence time of 5 min. In one embodiment, the change in the absolute weight average molecular weight ("$M_w$") due to injection molding is less than 15%, when the composition is injection molded with a barrel temperature of 260° C. with a residence time of 5 min. In one embodiment, the change in the absolute weight average molecular weight ("$M_w$") due to injection molding is less than 10%, when the composition is injection molded with a barrel temperature of 260° C. with a residence time of 5 min.

In one embodiment, the composition has a notched izod impact strength of greater than 40 J/m as measured according to ASTM D256 using a 3.2 mm thick bar that has been subjected to 50% relative humidity for 48 hours at 23° C. In one embodiment, the composition has a notched izod impact strength of greater than 60 J/m as measured according to ASTM D256 using a 3.2 mm thick bar that has been subjected to 50% relative humidity for 48 hours at 23° C. In one embodiment, the composition has a notched izod impact strength of greater than 80 J/m as measured according to ASTM D256 using a 3.2 mm thick bar that has been subjected to 50% relative humidity for 48 hours at 23° C. In one embodiment, the composition has a notched izod impact strength of greater than 90 J/m as measured according to ASTM D256 using a 3.2 mm thick bar that has been subjected to 50% relative humidity for 48 hours at 23° C. In one embodiment, the composition has a notched izod impact strength of greater than 100 J/m as measured according to ASTM D256 using a 3.2 mm thick bar that has been subjected to 50% relative humidity for 48 hours at 23° C. In one embodiment, the composition has a notched izod impact strength is in the range of from about 40 J/m to about 400 J/m as measured according to ASTM D256 using a 3.2 mm thick bar that has been subjected to 50% relative humidity for 48 hours at 23° C. In one embodiment, the composition has a notched izod impact strength is in the range of from about 40 J/m to about 200 J/m as measured according to ASTM D256 using a 3.2 mm thick bar that has been subjected to 50% relative humidity for 48 hours at 23° C. In one embodiment, the composition has a notched izod impact strength is in the range of from about 60 J/m to about 400 J/m as measured according to ASTM D256 using a 3.2 mm thick bar that has been subjected to 50% relative humidity for 48 hours at 23° C. In one embodiment, the composition has a notched izod impact strength is in the range of from about 60 J/m to about 200 J/m as measured according to ASTM D256 using a 3.2 mm thick bar that has been subjected to 50% relative humidity for 48 hours at 23° C. In one embodiment, the composition has a notched izod impact strength is in the range of from about 80 J/m to about 500 J/m as measured according to ASTM D256 using a 3.2 mm thick bar that has been subjected to 50% relative humidity for 48 hours at 23° C. In one embodiment, the composition has a notched izod impact strength is in the range of from about 80 J/m to about 400 J/m as measured according to ASTM D256 using a 3.2 mm thick bar that has been subjected to 50% relative humidity for 48 hours at 23° C. In one embodiment, the composition has a notched izod impact strength is in the range of from about 80 J/m to about 300 J/m as measured according to ASTM D256 using a 3.2 mm thick bar that has been subjected to 50% relative humidity for 48 hours at 23° C. In one embodiment, the composition has a notched izod impact strength is in the range of from about 80 J/m to about 200 J/m as measured according to ASTM D256 using a 3.2 mm thick bar that has been subjected to 50% relative humidity for 48 hours at 23° C.

In one embodiment, the composition has a flexural modulus of greater than 1800 MPa as measured according to ASTM D790 using a 3.2 mm thick bar that has been subjected to 50% relative humidity for 48 hours at 23° C. In one embodiment, the composition has a flexural modulus of greater than 1900 MPa as measured according to ASTM D790 using a 3.2 mm thick bar that has been subjected to 50% relative humidity for 48 hours at 23° C. In one embodiment, the composition has a flexural modulus of greater than 2000 MPa as measured according to ASTM D790 using a 3.2 mm thick bar that has been subjected to 50% relative humidity for 48 hours at 23° C. In one embodiment, the composition has a flexural modulus of greater than 2100 MPa as measured according to ASTM D790 using a 3.2 mm thick bar that has been subjected to 50% relative humidity for 48 hours at 23° C. In one embodiment, the composition has a flexural modulus of greater than 2200 MPa as measured according to ASTM D790 using a 3.2 mm thick bar that has been subjected to 50% relative humidity for 48 hours at 23° C. In one embodiment, the composition has a flexural modulus of greater than 2400 MPa as measured according to ASTM D790 using a 3.2 mm thick bar that has been subjected to 50% relative humidity for 48 hours at 23° C. In one embodiment, the composition has a flexural modulus is in the range of from about 1800 to about 3500 MPa as measured according to ASTM D790 using a 3.2 mm thick bar that has been subjected to 50% relative humidity for 48 hours at 23° C. In one embodiment, the composition has a flexural modulus is in the range of from about 1900 to about 3500 MPa as measured according to ASTM D790 using a 3.2 mm thick bar that has been subjected to 50% relative humidity for 48 hours at 23° C. In one embodiment, the composition has a flexural modulus is in the range of from about 2000 to about 3500 MPa as measured according to ASTM D790 using a 3.2 mm thick bar that has been subjected to 50% relative humidity for 48 hours at 23° C. In one embodiment, the composition has a flexural modulus is in the range of from about 2100 to about 3500 MPa as measured according to ASTM D790 using a 3.2 mm thick bar that has been subjected to 50% relative humidity for 48 hours at 23° C. In one embodiment, the composition has a flexural modulus is in the range of from about 2200 to about 3500 MPa as measured according to ASTM D790 using a 3.2 mm thick bar that has been subjected to 50% relative humidity for 48 hours at 23° C. In one embodiment, the composition has a flexural modulus is in the range of from about 2300 to about 3500 MPa as measured according to ASTM D790 using a 3.2 mm thick bar that has been subjected to 50% relative humidity for 48 hours at 23° C. In one embodiment, the composition has a flexural modulus is in the range of from about 2400 to about 3500 MPa as measured according to ASTM D790 using a 3.2 mm thick bar that has been subjected to 50% relative humidity for 48 hours at 23° C. In one embodiment, the composition has a flexural modulus is in the range of from about 2500 to about 3500 MPa as measured according to ASTM D790 using a 3.2 mm thick bar that has been subjected to 50% relative humidity for 48 hours at 23° C. In one embodiment, the composition has a flexural modulus is in the range of from about 1900 to about 2500 MPa as measured according to ASTM D790 using a 3.2 mm thick bar that has been subjected to 50% relative humidity for 48 hours at 23° C. In one embodiment, the composition has a flexural modulus is in the range of from about 1900 to about 3000 MPa as measured according to ASTM D790 using a 3.2 mm thick bar that has been subjected to 50% relative humidity for 48 hours at 23° C. In one embodiment, the composition has a flexural modulus is in the range of from about 1900 to about 2800 MPa as measured according to ASTM D790 using a 3.2 mm thick bar that has been subjected to 50% relative humidity for 48 hours at 23° C.

In one embodiment, the spiral flow length is from about 3.0 cm to about 10.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm. In one embodiment, the spiral flow length is from about 4.0 cm to about 10.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm. In one embodiment, the spiral flow length is from about 5.0 cm to about 10.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm. In one embodiment, the spiral flow length is from about 4.0 cm to about 9.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm. In one embodiment, the spiral flow length is from about 4.0 cm to about 8.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm. In one embodiment, the spiral flow length is from about 4.0 cm to about 7.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm. In one embodiment, the spiral flow length is from about 5.0 cm to about 7.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm.

A salt stabilizer can be incorporated into the cellulose ester composition to stabilize the cellulose ester composition during processing. The cation component of the salt stabilizer is chosen from aluminum, calcium, magnesium, copper, cerium, antimony, nickel, cobalt, manganese, barium, strontium, zinc, zirconium, tin, cadmium, chromium and iron cations; and the anion component of the salt stabilizer is an $(C_{6-20})$alicyclic carboxylic acid, a $(C_{2-20})$alkyl carboxylic acid, or a $(C_{6-20})$alkenyl carboxylic acid. Examples of the $(C_{6-20})$alicyclic carboxylic acid, the $(C_{6-20})$alkyl carboxylic acid, or the $(C_{6-20})$alkenyl carboxylic acid include naphthenic acid, abietic acid, cyclohexane carboxylic acid, cyclohexane propionic acid, 3-methyl-cyclopentyl acetic acid, 4-methylcyclohexane carboxylic acid, 2,2,6-trimethylcyclohexane carboxylic acid, 2,3-dimethylcyclopentyl acetic acid, 2-methylcyclopentyl propionic acid, palmitic acid, stearic acid, oleic acid, lauric acid, and the like. Examples of the salt stabilizers include strontium naphthenate, copper naphthenate, calcium naphthenate, zinc naphthenate, magnesium naphthenate, copper abietate, magnesium abietate, titanium acetate, titanium propionate, titanium butyrate, antimony acetate, antimony propionate, antimony butyrate, zinc acetate, zinc propionate, zinc butyrate, tin acetate, tin propionate, tin butyrate, 2-ethylhexylamine, bis(2-ethylhexyl)amine, tetrabutyl phosphonium bromide, dodecyldimenylamine, N,N-dimentylbenzylamine, tetramethyl guanidine, benzyltimethyl ammonium hydroxide, tetrabutyl ammonium hydroxide, 2-ethylimidazole, DBU/2-ethylheaxnoic acid, aluminum acetylacetonate, aluminate lactate, bismuth octoate, calcium octoate, cerium naphthenate, chromium(III) 2-ethylhexanoate, cobalt octoate, copper II acetylacetonate, Iron (III) acetylacetonate, manganese naphthenate, nickel acetylacetonate, stannous octoate, zinc acetate, zinc acetylacetonate, zinc octoate, zirconium octoate, and the like.

In one embodiment, the cellulose ester composition further comprises a salt stabilizer in the range of from about 0.005 wt % to about 0.25 wt % based on the total weight of the composition. In one embodiment, the cellulose ester composition further comprises a salt stabilizer in the range of from about 0.005 wt % to about 0.2 wt % based on the total weight of the composition. In one embodiment, the cellulose ester composition further comprises a salt stabilizer in the range of from about 0.005 wt % to about 0.15 wt % based on the total weight of the composition. In one embodiment, the cellulose ester composition further comprises a salt stabilizer in the range of from about 0.005 wt % to about 0.1 wt % based on the total weight of the composition. In one embodiment, the cellulose ester composition further comprises a salt stabilizer in the range of from about 0.05 wt % to about 0.15 wt % based on the total weight of the composition. In one embodiment, the cellulose ester composition further comprises a salt stabilizer in the range of from about 0.005 wt % to about 0.05 wt % based on the total weight of the composition.

In embodiment, the composition further comprises a primary antioxidant in the range of from 0 to about 1.0 wt % based on the total weight of the composition. In one embodiment, the composition further comprises a primary antioxidant in the range of from about 0.1 to about 1.0 wt % based on the total weight of the composition. In one embodiment, the composition further comprises a primary antioxidant in the range of from about 0.2 to about 1.0 wt % based on the total weight of the composition. In one embodiment, the composition further comprises a primary antioxidant in the range of from about 0.3 to about 1.0 wt % based on the total weight of the composition. In one embodiment, the composition further comprises a primary antioxidant in the range of from about 0.4 to about 1.0 wt % based on the total weight of the composition. In one embodiment, the composition further comprises a primary antioxidant in the range of from about 0.5 to about 1.0 wt % based on the total weight of the composition. In one embodiment, the composition further comprises a primary antioxidant in the range of from about 0.6 to about 1.0 wt % based on the total weight of the composition. In one embodiment, the composition further comprises a primary antioxidant in the range of from about 0.7 to about 1.0 wt % based on the total weight of the composition. In one embodiment, the composition further comprises a primary antioxidant in the range of from about 0.8 to about 1.0 wt % based on the total weight of the composition. In one embodiment, the composition further comprises a primary antioxidant in the range of from about 0.1 to about 0.8 wt % based on the total weight of the composition. In one embodiment, the composition further comprises a primary antioxidant in the range of from about 0.1 to about 0.6 wt % based on the total weight of the composition. In one embodiment, the composition further comprises a primary antioxidant in the range of from about 0.1 to about 0.4 wt % based on the total weight of the composition. In one embodiment, the composition further comprises a secondary antioxidant in the range of from about 0.1 to about 0.8 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. 3,9-bis(2,4-di-tert-butylphenoxy)-2,4,8,10-tetraoxa-3,9-diphosphaspiro [5.5]undecane is sold under the tradename of Ultranox™ 626. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.2 to about 0.8 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition.

In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.3 to about 0.8 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.4 to about 0.8 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.5 to about 0.8 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.6 to about 0.8 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.1 to about 0.7 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.1 to about 0.6 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.1 to about 0.5 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.1 to about 0.4 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.1 to about 0.3 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.3 to about 0.7 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition.

In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant in the range of from about 0.3 to about 0.6 wt % based on the total weight of the composition. In one class of this embodiment, the secondary antioxidant that is 3,9-bis(2,4-di-tert-butylphenoxy)-2,4,8,10-tetraoxa-3,9-diphosphaspiro[5.5]undecane. In one subclass of this class, the composition further comprises an acid scavenger in the range of from about 0.2 to about 2.0 wt % based on the total weight of the composition. In one sub-subclass of this subclass the acid scavenger is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises a secondary antioxidant that is 3,9-bis(2,4-di-tert-butylphenoxy)-2,4,8,10-tetraoxa-3,9-diphosphaspiro[5.5]undecane. In one class of this embodiment, the composition further comprises an acid scavenger that is an epoxidized fatty acid ester.

In one class of this embodiment, the composition further comprises an acid scavenger in the range of from about 0.2 to about 2.0 wt % based on the total weight of the composition. In one subclass of this class, the composition further comprises a salt stabilizer in the range of from about 0.01 to about 0.5 wt % based on the total weight of the composition. In one sub-subclass of this subclass, the composition further comprises an impact modifier in the range of from about 0.1 to about 15 wt % based on the total weight of the composition. In one sub-sub-subclass of this sub-subclass, the composition further comprises a primary antioxidant in the range of from about 0.1 to about 1.0 wt % based on the total weight of the composition.

In one embodiment, the composition further comprises an acid scavenger in the range of from about 0.2 to about 2.0 wt % based on the total weight of the composition. In one embodiment, the composition further comprises an acid scavenger in the range of from about 0.4 to about 2.0 wt % based on the total weight of the composition. In one embodiment, the composition further comprises an acid scavenger in the range of from about 0.6 to about 2.0 wt % based on the total weight of the composition. In one embodiment, the composition further comprises an acid scavenger in the range of from about 0.8 to about 2.0 wt % based on the total weight of the composition. In one embodiment, the composition further comprises an acid scavenger in the range of from about 1.0 to about 2.0 wt % based on the total weight of the composition. In one embodiment, the composition further comprises an acid scavenger in the range of from about 1.2 to about 2.0 wt % based on the total weight of the composition. In one embodiment, the composition further comprises an acid scavenger in the range of from about 1.4 to about 2.0 wt % based on the total weight of the composition. In one embodiment, the composition further comprises an acid scavenger in the range of from about 1.6 to about 2.0 wt % based on the total weight of the composition. In one embodiment, the composition further comprises an acid scavenger in the range of from about 1.8 to about 2.0 wt % based on the total weight of the composition. In one embodiment, the composition further comprises an acid scavenger in the range of from about 0.2 to about 1.8 wt % based on the total weight of the composition. In one embodiment, the composition further comprises an acid scavenger in the range of from about 0.2 to about 1.6 wt % based on the total weight of the composition. In one embodiment, the composition further comprises an acid scavenger in the range of from about 0.2 to about 1.4 wt % based on the total weight of the composition. In one embodiment, the composition further comprises an acid scavenger in the range of from about 0.2 to about 1.2 wt % based on the total weight of the composition. In one embodiment, the composition further comprises an acid scavenger in the range of from about 0.2 to about 1.0 wt % based on the total weight of the composition. In one embodiment, the composition further comprises an acid scavenger in the range of from about 0.2 to about 0.8 wt % based on the total weight of the composition. In one embodiment, the composition further comprises an acid scavenger in the range of from about 0.2 to about 0.6 wt % based on the total weight of the composition. In one embodiment, the composition further comprises an acid scavenger in the range of from about 0.2 to about 0.4 wt % based on the total weight of the composition. In one embodiment, the composition further comprises an acid scavenger in the range of from about 0.4 to about 1.8 wt % based on the total weight of the composition. In one embodiment, the composition further comprises an acid scavenger in the range of from about 0.6 to about 1.6 wt % based on the total weight of the composition. In one embodiment, the composition further comprises an acid scavenger in the range of from about 0.8 to about 1.4 wt % based on the total weight of the composition. In one embodiment, the composition further comprises an acid scavenger in the range of from about 0.8 to about 1.2 wt % based on the total weight of the composition.

In one embodiment, the composition further comprises a secondary antioxidant in the range of from about 0.1 to about 0.8 wt % based on the total weight of the composition; and an acid scavenger in the range of from about 0.2 to about 2.0 wt % based on the total weight of the composition. In one class of this embodiment, the composition further comprises a salt stabilizer in the range of from about 0.01 wt % to about 0.5 wt %. In one class of this embodiment, the composition further comprises a salt stabilizer in the range of from about 0.01 wt % to about 0.1 wt %.

In one embodiment, the composition further comprises a primary antioxidant in the range of from about 0 to about 1.0 wt % based on the total weight of the composition; a secondary antioxidant in the range of from about 0.1 to about 0.8 wt % based on the total weight of the composition; and an acid scavenger in the range of from about 0.2 to about 2.0 wt % based on the total weight of the composition. In one class of this embodiment, the composition further comprises a salt stabilizer in the range of from about 0.01 wt % to about 0.5 wt %. In one class of this embodiment, the composition further comprises a salt stabilizer in the range of from about 0.01 wt % to about 0.1 wt %.

In one embodiment, the composition further comprises a secondary antioxidant in the range of from about 0.1 to about 0.8 wt % based on the total weight of the composition; an acid scavenger in the range of from about 0.2 to about 2.0 wt % based on the total weight of the composition; and an impact modifier in the range of from 0 to about 15 wt % based on the total weight of the composition. In one class of this embodiment, the composition further comprises a salt stabilizer in the range of from about 0.01 wt % to about 0.5 wt %. In one class of this embodiment, the composition further comprises a salt stabilizer in the range of from about 0.01 wt % to about 0.1 wt %.

In one embodiment, the composition further comprises a primary antioxidant in the range of from about 0 to about 1.0 wt % based on the total weight of the composition; a secondary antioxidant in the range of from about 0.1 to about 0.8 wt % based on the total weight of the composition; an acid scavenger in the range of from about 0.2 to about 2.0 wt % based on the total weight of the composition; and an impact modifier in the range of from 0 to about 15 wt % based on the total weight of the composition. In one class of this embodiment, the composition further comprises a salt stabilizer in the range of from about 0.01 wt % to ab out 0.5 wt %. In one class of this embodiment, the composition further comprises a salt stabilizer in the range of from about 0.01 wt % to ab out 0.1 wt %.

In embodiments, the cellulose ester utilized in this invention can be any that is known in the art. Cellulose esters that can be used for the present invention generally comprise repeating units of the structure:

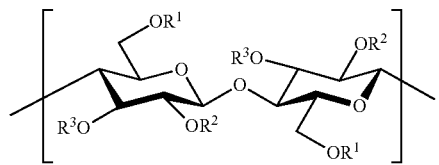

wherein $R^1$, $R^2$, and $R^3$ are selected independently from the group consisting of hydrogen or straight chain alkanoyl having from 2 to 10 carbon atoms. For cellulose esters, the substitution level is usually express in terms of degree of substitution (DS), which is the average number of non-OH substitutents per anhydroglucose unit (AGU). Generally, conventional cellulose contains three hydroxyl groups in each AGU unit that can be substituted; therefore, DS can have a value between zero and three. However, low molecular weight cellulose mixed esters can have a total degree of substitution slightly above 3 due to end group contributions. Native cellulose is a large polysaccharide with a degree of polymerization from 250-5,000 even after pulping and purification, and thus the assumption that the maximum DS is 3.0 is approximately correct. However, as the degree of polymerization is lowered, as in low molecular weight cellulose mixed esters, the end groups of the polysaccharide backbone become relatively more significant, thereby resulting in a DS that can range in excess of 3.0. Low molecular weight cellulose mixed esters are discussed in more detail subsequently in this disclosure. Because DS is a statistical mean value, a value of 1 does not assure that every AGU has a single substitutent. In some cases, there can be unsubstituted anhydroglucose units, some with two and some with three substitutents, and typically the value will be a non-integer. Total DS is defined as the average number of all of substituents per anhydroglucose unit. The degree of substitution per AGU can also refer to a particular substitutent, such as, for example, hydroxyl, acetyl, butyryl, or propionyl.

In one embodiment, the cellulose ester is chosen from a cellulose acetate, a cellulose propionate, a cellulose butyrate, a cellulose isobutyrate, a cellulose acetate propionate, a cellulose acetate butyrate, a cellulose acetate isobutyrate, a cellulose propionate butyrate, or a cellulose propionate isobutyrate. In one class of this embodiment, the cellulose ester is a cellulose acetate. In one class of this embodiment, the cellulose ester is a cellulose propionate. In one class of this embodiment, the cellulose ester is a cellulose butyrate. In one class of this embodiment, the cellulose ester is a cellulose isobutyrate. In one class of this embodiment, the cellulose ester is a cellulose acetate propionate. In one class of this embodiment, the cellulose ester is a cellulose acetate butyrate. In one class of this embodiment, the cellulose ester is a cellulose acetate isobutyrate. In one class of this embodiment, the cellulose ester is a cellulose propionate butyrate. In one class of this embodiment, the cellulose ester is a cellulose propionate isobutyrate.

In one class of this embodiment, the cellulose ester is chosen from a cellulose acetate, a cellulose propionate, a cellulose butyrate, a cellulose acetate propionate, and a cellulose acetate butyrate.

In one class of this embodiment, the cellulose ester is chosen from a cellulose acetate, a cellulose acetate propionate, or a cellulose acetate butyrate.

In one class of this embodiment, the cellulose ester is chosen from a cellulose acetate or a cellulose acetate propionate.

Cellulose esters can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444. Cellulose, the starting material for producing cellulose esters, can be obtained in different grades and sources such as from cotton linters, softwood pulp, hardwood pulp, corn fiber and other agricultural sources, and bacterial cellulose, among others.

In one embodiment, the composition further comprises an impact modifier in the range of from 0 to about 15 wt % based on the total weight of the composition. Impact modifiers can be any material found to increase the impact strength of cellulose ester compositions. For the purposes of this invention, an impact modifier is defined as any material in which at least one portion of its composition is an elastomer with a glass transition temperature (Tg) below room temperature. Tg can be measured for example according to ASTM D3418 using a TA 2100 Thermal Analyst Instrument using a scan rate of 20° C./min. Several classes of impact modifier fit this description.

In one class of this embodiment, the impact modifier is a modified polyolefin. In this class, the olefin is copolymerized with additional monomers that limit the crystallization of the polymer and increase the amount of the chain with Tg below room temperature and reduce the modulus below 500 MPa. Examples of modified olefins include EMA (examples include Elvaloy 4051, Lotader 3410 and Lotader 8900), EBA, EVA (examples include Levamelt 500, Levamelt 600, Levamelt 700, Levamelt 800, Elvax 40W, Evatane 28-40, Evatane 40-55, Evatane 18-150, Bynel E418 and Bynel 3101), EEA, EPDM (examples include Royaltuf 498), EPR, etc.

In one class of the embodiment, the impact modifier is a block copolymer in which at least one segment of the chain has a Tg below room temperature, referred to as the soft segment, and at least one segment of the chain has a Tg or Tm above room temperature, referred to as the hard segment. These block copolymers are also commonly referred to as thermoplastic elastomers (TPEs). Examples of block compolymers of this class include styrenic materials such as SBS, SEBS, and SIS (examples include Kraton G1657MS, Kraton FG1901 G and Kraton FG1924 G); thermoplastic urethanes (TPU) (examples include Elastolan 1170Z, Estane 2355, Estane ALR CL87A and Estane ALR 72A); polyester-ether copolymers (examples include Ecdel 9966 and Hytrel 3078) or polyamide-ether copolymers (examples include Pebax 5533).

In one class of this embodiment, the impact modifier a core-shell impact modifier. In one class of this embodiment, the impact modifier is a MBS core-shell impact modifier. Examples of MBS core-shell impact modifiers include a methacrylate-butadiene-styrene MBS core-shell impact modifier that has a core made out of butadiene-styrene copolymers and shell made out of methyl methacrylate-styrene copolymer.

Examples of methacrylate-butadiene-styrene core shell polymers are those described in, but not limited to, patents U.S. Pat. Nos. 4,446,585, 5,534,594, and 6,331,580. MBS core-shell impact modifiers can be obtained as Kane Ace B564 from Kaneka, Clearstrength from Arkema, Paraloid from Dow, and Visiomer from Evonik.

In one class of this embodiment, the impact modifier is an ABS core-shell impact modifier. Examples of ABS core-shell impact modifiers include a acrylonitrile-butadiene-styrene ABS core-shell impact modifier that has a core made out of butadiene-styrene copolymers and shell made out of acrylonitrile-styrene copolymer.

In one class of this embodiment, the impact modifier is a core shell impact modifier that is an acrylic impact modifier comprising about 25 to 95 weight percent of a first elastomeric phase polymerized from a monomer system comprising about 75 to 99.8 percent by weight of a (01-6) alkyl acrylate, 0.1 to 5 percent by weight cross-linking monomer, and 0.1 to 5 percent by weight graft linking monomer, and about 75 to 5 weight percent of a final, rigid thermoplastic phase free of epoxy groups polymerized in the presence of said elastomeric phase.

Examples of useful acrylates are methyl acrylate, ethyl acrylate, butyl acrylate, 2-ethylhexyl acrylate and the like. In some embodiments, the acrylates are n-butyl acrylate and ethyl acrylate.

Examples of acrylic core shell polymers are those described in, but not limited to, patents U.S. Pat. Nos. 3,448,173, 3,655,825, and 3,853,968. Examples of suitable acrylic impact modifiers are Kane Ace ECO100 from Kaneka, Durastrength from Arkema, Elvaloy and Elvaloy HP from DuPont, and Paraloid from Dow.

In one class of this embodiment, the impact modifier has a neutral acidity. It is believed that this will help prevent the cellulose esters from degrading during the melt processing of the compositions.

In one class of this embodiment, the refractive index (RI) of the impact modifier is sufficiently close to that of the cellulose esters to provide a composition with high transmission and low haze. In one class of this embodiment, the impact modifier is an acrylic impact modifier having a RI that is close to the RI of the cellulose ester of about 1.46-1.50 to provide clear compositions.

In one class of this embodiment, the impact modifier and cellulose ester components have a difference in refractive index, RI(second component)–RI(first component), of about 0.006 to about –0.0006, the immiscible blend has a percent transmittance of at least 75%, and a haze of less than 10%. In one class of this embodiment, the impact modifier and cellulose ester components have a difference in refractive index, RI(second component)–RI(first component), of about 0.006 to about –0.0006, the immiscible blend has a percent transmittance of at least 75%, and a haze of less than 5%.

In one class of this embodiment, the composition further comprising the impact modifier has a percent transmittance of at least 75%. In one class of this embodiment, the composition further comprising the impact modifier has a percent transmittance of at least 80%. In one class of this embodiment, the composition further comprising the impact modifier has a percent transmittance of at least 85%. In one class of this embodiment, the composition further comprising the impact modifier has a percent transmittance of at least 90%. In one class of this embodiment, the composition further comprising the impact modifier has a percent transmittance of at least 95%.

In one class of this embodiment, the composition further comprising the impact modifier has a percent haze of less than 10%. In one class of this embodiment, the composition further comprising the impact modifier has a percent haze of less than 8%. In one class of this embodiment, the composition further comprising the impact modifier has a percent haze of less than 6%. In one class of this embodiment, the composition further comprising the impact modifier has a percent haze of less than 5%.

In one class of this embodiment, the impact modifier can be either a non-reactive impact modifier or a reactive impact modifier, or combination of both. The impact modifiers used can also improve mechanical and physical properties of the cellulose ester compositions.

In one class of this embodiment, the impact modifier is a non-reactive impact modifier wherein the impact modifier contains a first polymeric chain segment that is more chemically or physically compatible with the cellulose ester than another polymeric chain segment.

Examples of non-reactive impact modifiers include, but are not limited to, ethoxylated alcohols, ethoxylated alkylphenols, ethoxylated fatty acids, polyethylenevinyl acetate, block polymers of propylene oxide and ethylene oxide, ethylene/propylene terpolymers, functionalized polyolephins, polyglycerol esters, polysaccharide esters, and sorbitan esters. Examples of ethoxylated alcohols are $C_{11}$-$C_{15}$ secondary alcohol ethoxylates, polyoxyethylene cetyl ether, polyoxyethylene stearyl ether, and $C_{12}$-$C_{14}$ natural liner alcohol ethoxylated with ethylene oxide. $C_{11}$-$C_{15}$ secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. $C_{12}$-$C_{14}$ natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids can include polyethyleneglycol monostearate or monolaruate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

The non-reactive impact modifiers can be synthesized in situ in the cellulose ester composition by reacting cellulose ester-compatible compounds. These compounds can be, for example, telechelic oligomers, which are defined as prepolymers capable of entering into further polymerization or other reaction through their reactive end groups. In one embodiment of the invention, these in situ impact modifiers can have higher molecular weight from about 10,000 to about 1,000,000.

In one class of this embodiment, the impact modifier can be reactive. The reactive impact modifier can comprise a polymer or oligomer compatible with one component of the composition and functionality capable of reacting with another component of the composition. There are two types of reactive impact modifiers that can be used. The first reactive impact modifier has a hydrocarbon chain that is compatible with the cellulose ester and also has functionality capable of reacting with the cellulose ester. Such functional groups include, but are not limited to, carboxylic acids, anhydrides, acid chlorides, epoxides, and isocyanates. Specific examples of this type of reactive impact modifier include, but are not limited to: long chain fatty acids, such as, stearic acid (octadecanoic acid); long chain fatty acid chlorides, such as, stearoyl chloride (octadecanoyl chloride); long chain fatty acid anhydrides, such as, stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, e.g. terpolymers of ethylene, acrylic ester and maleic anhydride; and copolymers of glycidyl methacrylate with olefins and/or acrylic esters, e.g. terpolymers of ethylene, acrylic ester, and glycidyl methacrylate.

Reactive impact modifiers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotader® GMA AX 8840 random terpolymer of ethylene, acrylic ester, and glycidyl methacrylate.

Modified polyolefin impact modifiers can be obtained as Lotader, Fusabond, Elvloy PTW, Lotryl, Elvaloy AC, Inter-Loy).

The second type of reactive impact modifier has a polar chain that is compatible with the cellulose ester and also has functionality capable of reacting with the cellulose ester. Examples of these types of reactive impact modifiers include cellulose esters or polyethylene glycols with olefin or thiol functionality. Reactive polyethylene glycol impact modifiers with olefin functionality include, but are not limited to, polyethylene glycol allyl ether and polyethylene glycol acrylate. An example of a reactive polyethylene glycol impact modifier with thiol functionality includes polyethylene glycol thiol. An example of a reactive cellulose ester impact modifier includes mercaptoacetate cellulose ester.

In one embodiment, the composition further comprises at least one additional polymeric component from about 1 wt % to about 50 wt % based on the total weight of the composition. In one embodiment, the composition further comprises at least one additional polymeric component from about 5 wt % to about 75 wt % based on the total weight of the composition. In one embodiment, the composition further comprises at least one additional polymeric component from about 5 wt % to about 50 wt % based on the total weight of the composition. In one embodiment, the composition further comprises at least one additional polymeric component from about 5 wt % to about 40 wt % based on the total weight of the composition. In one embodiment, the composition further comprises at least one additional polymeric component from about 5 wt % to about 30 wt % based on the total weight of the composition. In one embodiment, the composition further comprises at least one additional polymeric component from about 5 wt % to about 20 wt % based on the total weight of the composition. In one embodiment, the composition further comprises at least one additional polymeric component from about 5 wt % to about 10 wt % based on the total weight of the composition. Suitable examples of the additional polymeric component include, but are not limited to, nylon; polyesters; polyamides; polystyrene; other cellulose esters, cellulose ethers; polystyrene copolymers; styrene acrylonitrile copolymers; polyolephins; polyurethanes; acrylonitrile butadiene styrene copolymers; poly(methylmethacrylate); acrylic copolymers; poly(etherimides); polyphenylene oxides; polyvinylchloride; polyphenylene sulfides; polyphenylene sulfide/sulfones; poly(estercarbonates); polycarbonates; polysulfones; poly lactic acid; poly butylenesuccinate; polysulfone ethers; and poly(etherketones) of aromatic dihydroxy compounds; or mixtures of any of the foregoing polymers.

The plasticizer utilized in this invention can be any that is known in the art that can reduce the glass transition temperature and/or the melt viscosity of the cellulose ester to improve melt processing characteristics. The plasticizer may be any plasticizer suitable for use with a cellulose ester. The plasticizer level should be lower than the normal (or typical) plasticizer level for cellulose esters; so that the compositions have higher Tg than fully plasticized cellulose ester compositions, good toughness and good flow. The plasticizer is present in an amount that does not reduce the Tg of the cellulose ester composition below 120° C. compared to a similar composition without the plasticizer.

In one embodiment, the plasticizer is present. In one class of this embodiment, the plasticizer is present at level that does not reduce the Tg of the composition more than 20%. In one class of this embodiment, the plasticizer is present at level that does not reduce the Tg of the composition more than 15%. In one class of this embodiment, the plasticizer is present at level that does not reduce the Tg of the composition more than 10%. In one class of this embodiment, the plasticizer is present at level that does not reduce the Tg of the composition more than 8%. In one class of this embodiment, the plasticizer is present at level that does not reduce the Tg of the composition more than 6%. In one class of this embodiment, the plasticizer is present at level that does not reduce the Tg of the composition more than 4%. In one class of this embodiment, the plasticizer is present at level that does not reduce the Tg of the composition more than 2%. In one class of this embodiment, the plasticizer is present at level that does not reduce the Tg of the composition more than 1%.

In one embodiment, the plasticizer is present at less than 20 wt % based on the total weight of the composition. In one embodiment, the plasticizer is present at less than 18 wt % based on the total weight of the composition. In one embodiment, the plasticizer is present at less than 16 wt % based on the total weight of the composition. In one embodiment, the plasticizer is present at less than 14 wt % based on the total weight of the composition. In one embodiment, the plasticizer is present at less than 12 wt % based on the total weight of the composition. In one embodiment, the plasticizer is present at less than 10 wt % based on the total weight of the composition. In one embodiment, the plasticizer is present at less than 8 wt % based on the total weight of the composition. In one embodiment, the plasticizer is present at less than 6 wt % based on the total weight of the composition. In one embodiment, the plasticizer is present at less than 5 wt % based on the total weight of the composition. In one embodiment, the plasticizer is present at less than 4 wt % based on the total weight of the composition. In one embodiment, the plasticizer is present at less than 3 wt % based on the total weight of the composition. In one embodiment, the plasticizer is present at less than 1 wt % based on the total weight of the composition. In one embodiment, the plasticizer is present at less than 0.5 wt % based on the total weight of the composition. In one embodiment, the plasticizer is present in the range of from about 5 wt % to about 20 wt % based on the total weight of the composition. In one class of this embodiment, the cellulose ester is a cellulose acetate. In one embodiment, the plasticizer is present in the range of from about 0 wt % to about 5 wt % based on the total weight of the composition. In one class of this embodiment, the cellulose ester is a cellulose acetate propionate or a cellulose acetate butyrate. In one embodiment, the plasticizer is present in the range of from about 5 wt % to about 10 wt % based on the total weight of the composition. In one embodiment, the plasticizer is present in the range of from about 10 wt % to about 15 wt % based on the total weight of the composition. In one embodiment, the plasticizer is present in the range of from about 8 wt % to about 12 wt % based on the total weight of the composition. In one embodiment, the plasticizer is present in the range of from about 15 wt % to about 20 wt % based on the total weight of the composition. In one embodiment, the plasticizer is not present.

The plasticizer can be either monomeric or polymeric in structure. In one embodiment, the plasticizer is at least one selected from the group consisting of an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic trimester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer.

In one class of this embodiment, the plasticizer is chosen from triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate, diethylene glycol dibenzoate, dipropylene glycol dibenozoate, or triethylene glycol dibenzoate.

In class of this embodiment of the invention, the plasticizer is an ester synthesized from (i) acid residues chosen from one or more of phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues chosen from one or more residues of an aliphatic, a cycloaliphatic, or an aromatic alcohol each containing up to about 20 carbon atoms.

In one class of this embodiment, the plasticizer comprises alcohol residues where the alcohol residues is at least one chosen from stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In one class of this embodiment, the plasticizer is chosen from a benzoate, a phthalate, a phosphate, an arylene-bis (diaryl phosphate), or an isophthalate. In one class of this embodiment, the plasticizer comprises diethylene glycol dibenzoate, abbreviated herein as "DEGDB."

In one class of this embodiment, the plasticizer is chosen from an aliphatic polyester comprising $C_{2-10}$ diacid residues; $C_{2-10}$ diol residues. Examples of such $C_{2-10}$ diacid residues include malonic acid, succinic acid, glutaric acid, adipic acid, pimelic acid, suberic acid, azelaic acid, and sebacic acid; and $C_{2-10}$ diol residues. Examples of such $C_{2-10}$ diol residues include ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, or tetraethylene glycol.

In one class of this embodiment, the plasticizer is a polyglycol. Examples of polyglycols include polyethylene glycol, polypropylene glycol, or polybutylene glycol. These can range from low molecular weight dimers and trimers to high molecular weight oligomers and polymers. The molecular weight of the polyglycol can be in the range of from about 200 to about 2000 daltons.

In one class of this embodiment, the plasticizer is chosen from Resoflex® R296 plasticizer, Resoflex® 804 plastocizer, SHP (sorbitol hexapropionate), XPP (xylitol pentapropionate), XPA (xylitol pentaacetate), GPA (glucose pentaacetate), GPP (glucose pentapropionate) or APP (arabitol pentapropionate).

In one class of this embodiment, the plasticizer comprises one or more of: A) from about 5 to about 95 weight % of a $C_2$-$C_{12}$ carbohydrate organic ester, wherein the carbohydrate comprises from about 1 to about 3 monosaccharide units; and B) from about 5 to about 95 weight % of a $C_2$-$C_{12}$ polyol ester, wherein the polyol is derived from a $C_5$ or $C_6$ carbohydrate. In one subclass of this class, the polyol ester does not comprise or contain polyol acetates.

In one class of this embodiment, the plasticizer comprises at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose and raffinose.

In one class of this embodiment, the plasticizer comprises at least one carbohydrate ester and the carbohydrate portion of the carbohydrate ester comprises one or more of α-glucose pentaacetate, δ-glucose pentaacetate, α-glucose pentapropionate, β-glucose pentapropionate, α-glucose pentabutyrate and β-glucose pentabutyrate.

In class of this embodiment, the plasticizer comprises at least one carbohydrate ester and the carbohydrate portion of the carbohydrate ester comprises an α-anomer, a β-anomer or a mixture thereof.

In class of this embodiment, the plasticizer is chosen from propylene glycol dibenzoate, glyceryl tribenzoate, diethylene glycol dibenzoate, triethylene glycol dibenzoate, di propylene glycol dibenzoate, or polyethylene glycol dibenzoate.

In one class of this embodiment, the plasticizer can be a solid, non-crystalline resin. These resins can contain some amount of aromatic or polar functionality and can lower the melt viscosity of the cellulose esters. The resin includes a rosin; a hydrogenated rosin; a stabilized rosin, and their monofunctional alcohol esters or polyol esters; a modified rosin including, but not limited to, maleic- and phenol-modified rosins and their esters; terpene resins; phenol-modified terpene resins; coumarin-indene resins; phenolic resins; alkylphenol-acetylene resins; and phenol-formaldehyde resins.

In class of this embodiment, the plasticizer is chosen from triacetin, trimethyl phosphate, triethyl phosphate, tributyl phosphate, triphenyl phosphate, triethyl citrate, acetyl trimethyl citrate, acetyl triethyl citrate, acetyl tributyl citrate, tributyl-o-acetyl citrate, dibutyl phthalate, diaryl phthalate, diethyl phthalate, dimethyl phthalate, di-2-methoxyethyl phthalate, di-octyl phthalate, di-octyl adipate, dibutyl tartrate, ethyl o-benzoylbenzoate, ethyl phthalyl ethyl glycolate, methyl phthalyl ethyl glycolate, n-ethyltoluenesulfonamide, o-cresyl p-toluenesulfonate, aromatic diol, substituted aromatic diols, aromatic ethers, tripropionin, tribenzoin, polycaprolactone, glycerin, glycerin esters, diacetin, glycerol acetate benzoate, polyethylene glycol, polyethylene glycol esters, polyethylene glycol diesters, di-2-ethylhexyl polyethylene glycol ester, glycerol esters, diethylene glycol, polypropylene glycol, polyglycoldiglycidyl ethers, dimethyl sulfoxide, N-methyl pyrollidinone, C1-C20 dicarboxylic acid esters, dimethyl adipate, di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, γ-valerolactone, alkylphosphate esters, aryl phosphate esters, phospholipids, eugenol, cinnamyl alcohol, camphor, methoxy hydroxy acetophenone, vanillin, ethylvanillin, 2-phenoxyethanol, glycol ethers, glycol esters, glycol ester ethers, polyglycol ethers, polyglycol esters, ethylene glycol ethers, propylene glycol ethers, ethylene glycol esters, propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, diethylene glycol dibenzoate, dipropylene glycol dibenzoate, triethylene glycol dibenzoate, butylated hydroxytoluene, butylated hydroxyanisol, sorbitol, xylitol, ethylene diamine, piperidine, piperazine, hexamethylene diamine, triazine, triazole, or pyrrole.

In one embodiment, the composition contains no plasticizer.

In one embodiment, the composition is melt processable. Melt processbility generally refers to the ability to thermally process the materials below their degradation temperature to obtain homogeneous pellets or plastic articles. For example, the compositions described can be melt extruded on a Werner & Pflerderer 30 mm twin screw extruder at a throughput of 35 lbs/hour with screw speed of 250 rpm and barrel temperature of 240° C. injection molded on a Toyo 110 injection molding machine with barrel temperature of 240° C. and mold temperature of 160° F. with minimal molecular weight or color degradation.

In one embodiment, the composition has a melt viscosity at 240° C. and 400 rad/s of 10,000 1/s or below as measured by a plate-plate melt rheometer such as a Rheometrics Dynamic Analyzer (RDA II) with 25 mm diameter parallel plates, 1 mm gap and 10% strain measured in accordance with ASTM D4440 using frequency scan of between 1 rad/sec and 400 rad/sec.

In one embodiment, the cellulose ester compositions further comprises at least one additive selected from the group comprising mold release agents, antistatic agents, whitening agents, colorants, flow aids, processing aids, anti-fog additives, minerals, UV stabilizers, lubricants, chain extenders, nucleating agents, reinforcing fillers, wood or flour fillers, glass fiber, carbon fiber, flame retardants, dyes, pigments, colorants, additional resins and combinations thereof.

Articles

The compositions of the present invention can be formed into shaped articles. In one embodiment, the shaped articles can be chosen from injection molded articles, extrusion molded articles, rotational molded articles, compression molded articles, blow molded articles, injection blow molded articles, injection stretch blow molded articles, extrusion blow molded articles, sheet or film extrusion articles, profile extrusion articles, gas assist molding articles, structural foam molded articles, or thermoformed articles.

In one embodiment, the shaped article is chosen from transparent articles, see-through articles, thin-walled articles, technical articles (e.g., articles having a complex design), articles having high design specifications, intricate design articles, articles made from molds that are difficult to fill under typical molding operations or conditions, wearable articles, body contact articles, containers (including containers for materials intended for body contact), food contact articles, household articles, general consumer products, packaging articles, medical articles, or components thereof.

In one embodiment, the transparent or see-through articles can be chosen from electronic displays, electronic display lenses or windows, electronic display covers, ophthalmic devices, ophthalmic lenses, ophthalmic frames, sunglasses, sunglass lenses, automotive interior parts, lighting devices, LED lights, lighting covers, headlight covers or enclosures, appliance parts, sporting goods, vehicle parts, instrumentation parts, instrumentation covers, timekeeping device parts, personal devices, personal electronic devices, medical devices, personal protection devices, safety devices, tools, guards, office supply devices, kitchen devices, kitchen articles, cutlery, glassware, barware, artist supply devices, decorative items, packaging, or components thereof.

In one embodiment, the thin-walled articles can be chosen from food packaging articles (e.g., food containers and lids), automotive or other vehicle articles (e.g. both structural and non-structural car parts), mobile telecommunications or handheld electronic articles (e.g. mobile phone housings), medical articles (e.g. syringes), computing equipment articles (e.g. computer housings), electronic devices, electronic parts, electronic housings, electronic covers, screens of electronic devices, touch screens, covers for screens or touch screens, automotive or other transportation parts, or components thereof.

In one embodiment, the technical articles, articles having high design specifications, intricate design articles, and difficult to mold articles can be chosen from transportation or automotive parts, electrical/electronic equipment parts, perfume or cosmetic containers, ophthalmic articles, lighting devices, timekeeping devices, medical devices, or components thereof.

In one embodiment, the wearable articles or body contact articles can be chosen from eyeglass frames, eyeglass lenses, sunglass frames, sunglass lenses, goggles, wearable electronics, headphones, watches, personal devices, personal electronics devices, medical devices, personal protection devices, safety devices, jewelry, water sport articles, or components thereof.

In one embodiment, the household articles or general consumer articles can be chosen from kitchenware, barware, outdoor furniture, toys, luggage, appliances, small appliances, storage containers, office supply items, bathroom devices or fixtures, tools, home electronics, or components thereof.

In one embodiment, the packaging articles can be chosen from packaging systems, product packaging, containers, thin-walled cups, beakers, buckets, pails, folding boxes, crates, or components thereof.

In one embodiment, the medical articles or devices can be chosen from disposable items, syringes, tubing, instruments, instrumentation, handles, medical packaging, medical containers, housings, or components thereof.

This invention can be further illustrated by the following examples, although it will be understood that these examples are included merely for purposes of illustration and are not intended to limit the scope of the invention unless otherwise specifically indicated.

EXAMPLES

This invention can be further illustrated by the following examples of embodiments thereof. These examples are included merely for purposes of illustration and are not intended to limit the scope of the invention unless otherwise specifically indicated.

Abbreviations

Ex is example(s); CA is cellulose acetate; CAB is cellulose acetate butyrate; CAP is cellulose acetate propionate; % H is percent haze; % T is percent transmission; $M_w$ is absolute weight average molecular weight, $\Delta M_w\%$ is change in absolute weight average molecular weight; % H is percent haze; RH is relative humidity; ° C. is Degree(s) Celsius; min is minute(s); ° F. is Degree(s) Fahrenheit; Comp Ex is comparative example; Pz is plasticizer; Antiox. is antioxidant; SNMO is AKCROSTAB SN-MO; Temp. is temperature; min is minute; NPPP is WESTON Neopentylphenylphosphite; Prim. Is primary; IM is impact modifier; Scav. is scavenger; Stab. Is stabilizer; CE is cellulose ester; oz is ounce; in/sec is inch/second; sec or s is second(s); psi is pounds per square inch; BSP is barrel set point; RT is residence time;

General Procedure for Preparation of Compositions

The examples were prepared by pre-mixing the cellulose ester powder with additives such as stabilizers, impact modifiers and plasticizers at room temperature for 20 minutes in a Hobart mixer.

Example 1

Example 1 was prepared by mixing Eastman™ CAP 482-20 (18.484 lb, 92.42 wt %), ECO 100 (1.2 lb, 6.0 wt %), IRGANOX 1010 (0.05 lb, 0.25 wt %), IRGAFOS 168 (0.066 lb, 0.33 wt %), DRAPEX 4.4 (0.194 lb, 0.97 wt %), SNMO (0.0006 lb, 0.03 wt %) in a Hobart mixer for 20 minutes at room temperature.

A series of compositions were made to determine the effect of different stabilizers on critical properties as noted in the examples in Table 1. The base material used for these examples was Eastman™ CAP 482-20.

TABLE 1

| EX # | CE, Wt % | IM, (Wt %) | Prim. Antiox., (Wt %) | Second. Antiox., (Wt %) | Acid Scav., (Wt %) | Salt Stab., (Wt %) |
|---|---|---|---|---|---|---|
| 2 | CAP 482-20 (98.98) | | | NPPP (0.10) | DRAPEX 4.4 (0.90) | SNMO (0.02) |
| 3 | CAP 482-20 (92.98) | ECO100 (6.0) | | NPPP (0.10) | DRAPEX 4.4 (0.90) | SNMO (0.02) |
| 4 | CAP 482-20 (92.97) | ECO100 (6.0) | | ULTRANOX 626 (0.33%) | DRAPEX 4.4 (0.68) | SNMO (0.02) |
| 5 | CAP 482-20 (98.97) | | | ULTRANOX 626 (0.33) | DRAPEX 4.4 (0.68) | SNMO (0.02) |
| 6 | CAP 482-20 (92.72) | ECO100 (6.0) | IRGANOX 1010 (0.25) | ULTRANOX 626 (0.33) | DRAPEX 4.4 (0.68) | SNMO (0.02) |
| 7 | CAP 482-20 (92.47) | ECO100 (6.0) | IRGANOX 1010 (0.50) | ULTRANOX 626 (0.33) | DRAPEX 4.4 (0.68) | SNMO (0.02) |
| 8 | CAP 482-20 (92.42) | ECO100 (6.0) | IRGANOX 1010 (0.25) | ULTRANOX 626 (0.33) | DRAPEX 4.4 (0.97) | SNMO (0.03%) |
| 9 | CAP 482-20 (92.72) | ECO100 (6.0) | IRGANOX 1010 (0.25) | ULTRANOX 626 (0.33) | DRAPEX 4.4 (0.68) | SNMO (0.02) |
| 10 | CAP 482-20 (92.42) | ECO100 (6.0%) | IRGANOX 1010 (0.25) | ULTRANOX 626 (0.33) | VIKOFLEX 7170 (0.97) | SNMO (0.03) |
| 11 | CAP 482-20 (92.17) | ECO100 (6.0%) | IRGANOX 1010 (0.50) | ULTRANOX 626 (0.33) | VIKOFLEX 7170 (0.97) | SNMO (0.03) |
| 12 | CAP 482-20 (98.17) | | IRGANOX 1010 (0.50) | ULTRANOX 626 (0.33) | DRAPEX 4.4 (0.97) | SNMO (0.03) |
| 13 | CAP 482-20 (92.17) | ECO100 (6.0) | IRGANOX 1010 (0.50) | ULTRANOX 626 (0.33) | DRAPEX 4.4 (0.97) | SNMO (0.03) |

Comp Ex 1 is a control and is a typical Plasticized CE formulation made from CAP 482-20. Comp Ex 2-4 were prepared by adapting the previously disclosed procedures. The base material used for these comparative examples was Eastman™ CAP 482-20.

TABLE 2

Comp Ex 1-4

| Comp EX # | CE, (Wt %) | Pz, (Wt %) | IM, (Wt %) | Prim. Antiox., (Wt %) | Second. Antiox., (Wt %) | Acid Scav., (Wt %) | Salt Stab., (Wt %) |
| --- | --- | --- | --- | --- | --- | --- | --- |
| 1 | CAP 482-20 (93.0) | DOA (6.0) | | | NPPP (0.10) | DRAPEX 4.4 (0.8) | SNMO (0.02) |
| 2 | CAP 482-20 (92.17) | | ECO100 (6.0) | IRGANOX 1010 (0.50%)/ LOWINOX 44B25 (0.33) | | DRAPEX 4.4 (0.97) | SNMO (0.03) |
| 3 | CAP 482-20 (88.0) | DOA (11.1) | | | NPPP (0.09) | DRAPEX 4.4 (0.8) | SNMO (0.02) |
| 4 | CA 398-30 (73.0) | DEP (26.2) | | t-Butyl Phenol (0.29) | NPPP (0.05) | DRAPEX 4.4 (0.4) | SNMO (0.01) |

Pellet Production

The premixed material (Ex 1-13 and Comp Ex 1-4) was then fed into the throat of a Davis-Standard 32 mm extruder and compounded at a throughput of 40 lb/hour with screw speed of 300 rpm and barrel temperature of 225° C. for the Eastman™ CAP 482-20 based compositions to produce pellets.

Plaque Production

Pellets of the compounded material were injection molded in a 150 Ton Toyo injection molding machine with a barrel capacity of 6.7 oz at 1 in/sec injection speed into two 4 inch×4 inch×0.126 (10.2 cm×10.2 cm×0.32 cm) plaques per shot with barrel temperature nominally of 249° C. (480° F.) or 260° C. (500° F.) with a residence time of 2 min or 5 min, and a mold temperature of 80° C.

Test Bar Production

Pellets of the compounded material were injection molded to form standard test bars 0.5 inch×5 inch×0.125 inch (1.27 cm×12.7 cm×0.3 cm). The pellets were molded in A 110 Ton Toyo injection molding machine with barrel capacity 3.4 oz. The compounded material is typically injection molded at 1 In./sec injection speed into four test bars per shot with barrel temperature nominally of 249° C. (480° F.) and mold temperature of 80° C.

Test Methods

Samples were evaluated using standard ASTM test methods with any special conditions noted below.

TABLE 3

Test Methods

| PROPERTY | COMMENTS |
| --- | --- |
| Color, b* (ASTM E1348) | Using 3.2 mm thick plaques. Measured using Hunter Lab Ultrascan Spectra Colorimeter |
| Color, a* (ASTM E1348) | Using 3.2 mm thick plaques. Measured using Hunter Lab Ultrascan Spectra Colorimeter |
| Color, L* (ASTM E1348) | Using 3.2 mm thick plaques. Measured using Hunter Lab Ultrascan Spectra Colorimeter |
| Haze (ASTM D1003) | Using 3.2 mm plaques |
| Transmission (ASTM D1003) | Using 3.2 mm plaques |
| $\Delta M_w\%$ (GPC) | % Change in Absolute Weight Average Molecular Weight From Pellet To Plaque or Test Bar Based On Pellet Absolute Molecular Weight |
| Izod Notched Impact at 23° C. (ASTM D256) | Using a 0.32 mm thick bar that has been subjected to 50% relative humidity at 23° C. for 48 hours immediately before running the test. |
| HDT 1.82 MPa (ASTM D648) | Using a 0.32 mm thick bar subjected to 70° C. for 4 hours immediately before running the test. |
| Flexural Modulus (ASTM D790) | Using a 1.3 cm × 12.7 cm × 0.3 mm bar subjected to 50% Relative humidity for 48 hours at 23° C. |
| Absolute Weight Average Molecular Weight (ASTM D5296) | Using tetrahydrofuran stabilized with BHT as a solvent and a flow rate of 1 mL/min. |

Spiral Flow
3.2 mm Thick Bar

A reciprocating screw injection molding machine having 110 tons of clamping force with a screw diameter of 32 mm was equipped with a water-cooled, cold runner mold with a spiral-shaped cavity having dimensions of 0.50" wide×0.125" deep×60.00" in length. The cavity was fed via a 3.5" long cold sprue with a nominal 0.400" diameter and 3-degree taper, followed by a 1.0" long cold runner with 0.30" nominal diameter, followed by a rectangular gate 0.25" wide×0.050" thick×0.10" long. Variables controlled for the range of experimentation included resin drying, injection unit barrel temperature, mold temperature, initial injection speed, injection pressure limit, screw rotation speed and back pressure on screw recovery, injection time, and cycle time.

For each combination of variables, responses included actual melt temperature and distance of melt travel in the spiral-shaped cavity, excluding the runner and gate. The injection process was allowed to stabilize at each set of conditions—typically 10 to 15 shots—and then 10 molded specimens were collected for an average reported flow length.

All materials were molded using pressure control, with mold temperature of 80 F, initial injection speed of 1 in/s, injection unit pressure limit of 1000 psi, injection time of 10 s, cycle time of 38 s, maximum cushion of 0.1", screw recovery rotation speed of 150 rpm, and screw recovery back pressure of 100 psi.

0.8 mm Thick Bar

A reciprocating screw injection molding machine having 110 tons of clamping force with a screw diameter of 32 mm was equipped with a water-cooled, cold runner mold with a spiral-shaped cavity having dimensions of 0.50" wide×0.030" deep×60.00" in length. The cavity was fed via a 3.5" long cold sprue with a nominal 0.400" diameter and 3-degree taper, followed by a 1.0" long cold runner with 0.30" nominal diameter, followed by a rectangular gate 0.25" wide×0.030" thick×0.10" long. Variables controlled for the range of experimentation included resin drying, injection unit barrel temperature, mold temperature, initial injection speed, injection pressure limit, screw rotation speed and back pressure on screw recovery, injection time, and cycle time.

For each combination of variables, responses included actual melt temperature and distance of melt travel in the spiral-shaped cavity, excluding the runner and gate. The injection process was allowed to stabilize at each set of conditions—typically 10 to 15 shots—and then 10 molded specimens were collected for an average reported flow length.

All materials were molded using pressure control, with mold temperature of 120° F., initial injection speed of 1 in/s, injection unit pressure limit of 2000 psi, injection time of 5 s, cycle time of 32 s, maximum cushion of 0.2", screw recovery rotation speed of 150 rpm, and screw recovery back pressure of 100 psi.

Test Results

The following results in Table 4 (Ex. 1-13 and Comp Ex 2) were obtained using 4 inch×4 inch plaques which were molded from pellets of compounded materials. The injection molding conditions are provided, and the color (L*, a*, b*), % H, and % T of the resulting plaques. The $M_w$ of the cellulose ester at the pellet stage and after being molded at the plaque stage are provided along with the % $\Delta M_w$ (from pellet to plaque).

TABLE 4

Analytical Results

| | Injection Molding Conditions | | Analytical Data | | | | | | | | |
|---|---|---|---|---|---|---|---|---|---|---|---|
| EX#. | BSP ° F. | RT min | Color L* | Color a* | Color b* | ΔE | % H | % T | Plaque $M_w$ | Pellet $M_w$ | Δ $M_w$, % |
| 1-1 | 480 | 2 | 90.1 | −0.4 | 16.8 |  | 5.6 | 80 | 120,068 | 117,302 | −2 |
| 1-2 | 480 | 5 | 86.5 | 0.3 | 25.8 | 29.1 | 5.4 | 73 | 116,153 | 117,302 | 1 |
| 1-3 | 500 | 2 | 88.6 | −0.1 | 20.4 |  | 5.8 | 77 | 116,394 | 117,302 | 1 |
| 1-4 | 500 | 5 | 79.9 | 3.0 | 38.6 |  | 5.8 | 61 | 110,084 | 117,302 | 6 |
| 2-1 | 480 | 2 | 94.0 | −0.9 | 7.6 |  | 4.8 | 87 | 102,309 | 110,791 | 8 |
| 2-2 | 480 | 5 | 93.5 | −1.3 | 10.4 | 12.3 | 4.4 | 86 | 101,465 | 110,791 | 8 |
| 2-3 | 500 | 2 | 93.9 | −1.1 | 8.9 |  | 3.9 | 87 | 92,971 | 110,791 | 16 |
| 2-4 | 500 | 5 | 92.9 | −1.5 | 12.0 |  | 3.8 | 85 | 91,000 | 110,791 | 18 |
| 3-1 | 480 | 2 | 91.3 | −0.5 | 11.1 |  | 10.8 | 82 | 113,730 | 122,000 | 7 |
| 3-2 | 480 | 5 | 90.0 | −0.9 | 13.2 | 20.0 | 9.1 | 80 | 108,112 | 122,000 | 11 |
| 3-3 | 500 | 2 | 91.2 | −0.5 | 11.5 |  | 11.6 | 82 | 112,114 | 122,000 | 8 |
| 3-4 | 500 | 5 | 88.5 | −0.7 | 22.2 |  | 11.2 | 77 | 104,552 | 122,000 | 14 |
| 4-1 | 480 | 2 | 92.2 | −0.6 | 8.5 |  | 10.1 | 83 | 97,790 | 112,990 | 13 |
| 4-2 | 480 | 5 | 91.9 | −0.8 | 10.2 | 13.0 | 10.2 | 83 | 97,381 | 112,990 | 14 |
| 4-3 | 500 | 2 | 92.1 | −0.6 | 9.3 |  | 8.6 | 84 | 94,034 | 112,990 | 17 |
| 4-4 | 500 | 5 | 91.3 | −1.5 | 14.8 |  | 9.1 | 82 | 83,678 | 112,990 | 26 |
| 5-1 | 480 | 2 | 95.4 | −1.0 | 6.2 |  | 3.5 | 90 | 101,156 | 110,791 | 9 |
| 5-2 | 480 | 5 | 95.2 | −1.3 | 7.6 | 9.1 | 3.3 | 90 | 97,851 | 110,791 | 12 |
| 5-3 | 500 | 2 | 95.1 | −1.1 | 6.8 |  | 3.9 | 89 | 97,808 | 110,791 | 12 |
| 5-4 | 500 | 5 | 94.7 | −1.7 | 9.8 |  | 4.3 | 89 | 95,017 | 110,791 | 14 |
| 6-1 | 480 | 2 | 92.8 | −0.5 | 8.0 |  | 8.2 | 85 | 103,918 | 119,568 | 13 |
| 6-2 | 480 | 5 | 92.4 | −1.0 | 10.4 | 12.9 | 8.4 | 84 | 94,343 | 119,568 | 21 |
| 6-3 | 500 | 2 | 92.6 | −0.7 | 9.0 |  | 8.1 | 85 | 101,442 | 119,568 | 15 |
| 6-4 | 500 | 5 | 91.8 | −1.6 | 14.5 |  | 9.0 | 83 | 90,128 | 119,568 | 25 |
| 7-1 | 480 | 2 | 93.3 | −0.6 | 7.4 |  | 7.4 | 86 | 100,031 | 122,041 | 18 |
| 7-2 | 480 | 5 | 92.9 | −1.0 | 9.8 | 12.1 | 7.6 | 85 | 88,293 | 122,041 | 28 |
| 7-3 | 500 | 2 | 93.1 | −0.7 | 8.3 |  | 8.0 | 86 | 95,918 | 122,041 | 21 |
| 7-4 | 500 | 5 | 92.1 | −1.8 | 14.6 |  | 9.2 | 84 | 79,172 | 122,041 | 35 |
| 8-1 | 480 | 2 | 92.3 | −0.5 | 8.1 |  | 8.6 | 84 | 103,009 | 116,085 | 11 |

TABLE 4-continued

Analytical Results

| EX#. | Injection Molding Conditions BSP °F. | RT min | Color L* | Color a* | Color b* | ΔE | % H | % T | Plaque $M_w$ | Pellet $M_w$ | Δ $M_w$, % |
|---|---|---|---|---|---|---|---|---|---|---|---|
| 8-2 | 480 | 5 | 91.7 | −0.8 | 10.0 | 13.0 | 9.9 | 83 | 91,906 | 116,085 | 21 |
| 8-3 | 500 | 2 | 92.0 | −0.6 | 9.0 |  | 9.0 | 84 | 102,082 | 116,085 | 12 |
| 8-4 | 500 | 5 | 91.5 | −1.7 | 13.9 |  | 10.9 | 82 | 72,366 | 116,085 | 38 |
| 9-1 | 480 | 2 | 92.6 | −0.5 | 8.2 |  | 8.8 | 84 | 108,968 | 108,737 | 0 |
| 9-2 | 480 | 5 | 92.3 | −0.8 | 10.3 | 12.9 | 8.7 | 84 | 101,302 | 108,737 | 7 |
| 9-3 | 500 | 2 | 92.4 | −0.6 | 9.1 |  | 9.2 | 84 | 105,879 | 108,737 | 3 |
| 9-4 | 500 | 5 | 91.5 | −1.4 | 14.3 |  | 9.6 | 82 | 92,335 | 108,737 | 15 |
| 10-1 | 480 | 2 | 93.0 | −0.6 | 8.2 |  | 8.9 | 85 | 113,322 | 107,580 | −5 |
| 10-2 | 480 | 5 | 92.2 | −0.9 | 10.9 | 13.5 | 13.9 | 84 | 111,361 | 107,580 | −4 |
| 10-3 | 500 | 2 | 92.3 | −0.8 | 9.8 |  | 16.7 | 84 | 109,350 | 107,580 | −2 |
| 10-4 | 500 | 5 | 91.8 | −1.4 | 14.1 |  | 12.6 | 83 | 109,292 | 107,580 | −2 |
| 11-1 | 480 | 2 | 93.6 | −0.8 | 8.7 |  | 6.9 | 87 | 116,249 | 121,487 | 4 |
| 11-2 | 480 | 5 | 93.2 | −1.1 | 11.0 | 13.0 | 7.0 | 86 | 118,493 | 121,487 | 2 |
| 11-3 | 500 | 2 | 93.3 | −0.9 | 9.8 |  | 7.3 | 86 | 117,424 | 121,487 | 3 |
| 11-4 | 500 | 5 | 92.0 | −1.6 | 15.8 |  | 8.2 | 84 | 112,515 | 121,487 | 7 |
| 12-1 | 480 | 2 | 95.1 | −0.9 | 6.5 |  | 4.0 | 89 | 102,722 | 109,000 | 6 |
| 12-2 | 480 | 5 | 94.9 | −1.2 | 8.3 | 9.9 | 3.8 | 89 | 101,143 | 109,000 | 7 |
| 12-3 | 500 | 2 | 94.8 | −1.1 | 7.9 |  | 4.0 | 89 | 97,531 | 109,000 | 11 |
| 12-4 | 500 | 5 | 94.0 | −1.9 | 12.8 |  | 3.9 | 87 | 98,119 | 109,000 | 10 |
| 13-1 | 480 | 2 | 92.3 | −0.5 | 8.0 |  | 9.9 | 84 | 102,109 | 110,000 | 7 |
| 13-2 | 480 | 5 | 91.9 | −1.1 | 11.1 | 13.8 | 8.5 | 83 | 98,500 | 110,000 | 10 |
| 13-3 | 500 | 2 | 92.3 | −0.7 | 8.5 |  | 10.5 | 84 | 102,278 | 110,000 | 7 |
| 13-4 | 500 | 5 | 91.8 | −1.4 | 12.6 |  | 10.8 | 83 | 88,676 | 110,000 | 19 |
| Comp Ex 2-1 | 480 | 2 | 89.1 | −0.2 | 18.0 |  | 6.9 | 77 | 115,272 | 126,455 | 9 |
| Comp Ex 2-2 | 480 | 5 | 85.6 | 0.6 | 26.8 | 30.5 | 6.6 | 72 | 112,983 | 126,455 | 11 |
| Comp Ex 2-3 | 500 | 2 | 87.2 | 0.2 | 22.5 |  | 7.2 | 75 | 113,373 | 126,455 | 10 |
| Comp Ex 2-4 | 500 | 5 | 77.4 | 4.3 | 42.2 |  | 7.3 | 58 | 101,823 | 126,455 | 19 |

Table 5 provides the notched izod, heat distortion temperature and flexural modulus for Comp Ex 1, 3, and 4, and Ex. 2, 3, 12, and 13.

TABLE 5

| Ex. No. | Notched Izod 23° C. (J/m) | HDT @ 1.8 MPa (° C.) | Flex. Modulus (MPa) |
|---|---|---|---|
| Comp Ex 1 | 217 | 84 | 1845 |
| Comp Ex 3 | 400 | 75 | 1400 |
| Comp Ex 4 | 187 | 73 | 1400 |
| 2 | 80 | 103 | 2065 |
| 3 | 199 | 99 | 2010 |
| 12 | 80 | 103 | 2100 |
| 13 | 200 | 99 | 2000 |

Tables 6 and 7 provide spiral flow data for Ex. 12-13 and Comp Ex 3.

TABLE 6

| Ex. # | Barrel Temp. (° C.) | Melt Temp. (° C.) | Spiral flow @6.9 MPa, 3.2 mm mold thickness (cm) |
|---|---|---|---|
| 12 | 227 | 246 | — |
| 13 | 227 | 242 | 17.2 |
| 13 | 238 | 249 | 22 |
| 13 | 249 | 257 | 27.2 |
| Comp Ex 3 | 238 | 249 | 32 |

TABLE 7

| Ex. # | Barrel Temp. (° C.) | Melt Temp. (° C.) | Spiral Flow @ 13.8 MPa, 0.8 mm mold thickness (cm) |
|---|---|---|---|
| 12 | 227 | 235 | 5 |
| 12 | 238 | 246 | 5.8 |
| 12 | 249 | 257 | 6.2 |
| 13 | 227 | 235 | 5.5 |
| 13 | 238 | 246 | 6.2 |
| 13 | 249 | 257 | 7.0 |
| Comp Ex 3 | 227 | 235 | 9.2 |
| Comp Ex 3 | 238 | 246 | 10.0 |
| Comp Ex 3 | 249 | 257 | 12.5 |

EMBODIMENTS

Embodiment 1

A composition comprising a cellulose ester; and optionally a plasticizer,
 wherein when the plasticizer is present, the plasticizer is present at less than 20 wt % based on the total weight of the composition,
 wherein the composition has a heat distortion temperature ("HDT") that is in the range of from about 90° C. to about 140° C. according to ASTM D648 as measured at 1.82 MPa using a 3.2 mm thick bar subjected to 70° C. for 4 hours,
 wherein the change in the absolute weight average molecular weight ("$M_w$") due to injection molding is less than 30%, when the composition is injection molded with a barrel temperature of 260° C. with a residence time of 5 min.

Embodiment 2

The composition of Embodiment 1, wherein the composition further comprises a secondary antioxidant in the range of from about 0.1 to about 0.8 wt % based on the total weight of the composition.

Embodiment 3

The composition of Embodiment 2, wherein the secondary antioxidant is 3,9-bis(2,4-di-tert-butylphenoxy)-2,4,8,10-tetraoxa-3,9-diphosphaspiro[5.5]undecane.

Embodiment 4

The composition of any one of Embodiments 1-3, wherein the composition further comprises an acid scavenger in the range of from about 0.2 to about 2.0 wt % based on the total weight of the composition.

Embodiment 5

The composition of Embodiments 4, wherein the composition acid scavenger is an epoxidized fatty acid ester.

Embodiment 6

The composition of any one of Embodiments 1-5, wherein the composition further comprises a salt stabilizer in the range of from about 0.01 to about 0.5 wt % based on the total weight of the composition.

Embodiment 7

The composition of any one of Embodiments 1-6, wherein the composition further comprises an impact modifier in the range of from about 0.1 to about 15 wt % based on the total weigh of the composition.

Embodiment 8

The composition of any one of Embodiments 1-7, wherein the cellulose ester is chosen from a cellulose propionate, a cellulose butyrate, a cellulose isobutyrate, a cellulose acetate propionate, a cellulose acetate butyrate, a cellulose acetate isobutyrate, a cellulose propionate butyrate, or a cellulose propionate isobutyrate.

Embodiment 9

The composition of any one of Embodiments 1-7, wherein the cellulose ester is a cellulose acetate, wherein the composition has a heat distortion temperature ("HDT") that is in the range of from about 95° C. to about 140° C. according to ASTM D648 as measured at 1.82 MPa using a 3.2 mm thick bar subjected to 70° C. for 4 hours.

Embodiment 10

The composition of any one of Embodiments 1-9, wherein the plasticizer is not present.

Embodiment 11

The composition of any one of Embodiments 1-9, wherein the plasticizer is present at less than 5 wt % based on the total weight of the composition.

Embodiment 12

The composition of any one of Embodiments 1-9, wherein the plasticizer is present in the range of from about 5 wt % to about 20 wt %.

Embodiment 13

The composition of any one of Embodiments 1-12, wherein when the composition is injection molded with a barrel temperature of 260° C. with a residence time of 5 min, the b* value is less than 15 as measured according to ASTM E1348 using a 3.2 mm plaque made from the composition which has been injection molded with a barrel temperature of 249° C. with a residence time of 5 min.

Embodiment 14

The composition of any one of Embodiments 1-13, the ΔE value is less than 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min.

Embodiment 15

The composition of any one of Embodiments 1-14, wherein the composition has a notched izod impact strength of greater than 40 J/m as measured according to ASTM D256 using a 3.2 mm thick bar that has been subjected to 50% relative humidity for 48 hours at 23° C.

Embodiment 16

The composition of any one of Embodiments 1-15, wherein the composition has a flexural modulus of greater than 1800 MPa as measured according to ASTM D790 using a 3.2 mm thick bar that has been subjected to 50% relative humidity for 48 hours at 23° C.

Embodiment 17

The composition of any one of Embodiments 1-16, the cellulose ester has an absolute weight average molecular weight in the range of from about 40,000 Da to about 200,000 Da measured according to ASTM D5296 using tetrahydrofuran as a solvent and a flow rate of 1 mL/min.

Embodiment 18

The composition of any one of Embodiments 1-17, the spiral flow length is from about 3.0 cm to about 10.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm.

Embodiment 19

A molded article comprising the composition of any one of Embodiments 1-18.

Embodiment 20

The molded article of Embodiment 19, wherein the molded article is an eyeglass frame.

Embodiment 21

The molded article of Embodiment 19, wherein the molded article is a housing.

Embodiment 22

The molded article of Embodiment 19, wherein the molded article is a cosmetic container.

Other embodiments will be apparent to those skilled in the art from consideration of the specification and practice of the embodiments disclosed herein. It will be understood that variations and modifications can be effected within the spirit and scope of the disclosed embodiments. It is further intended that the specification and examples be considered as exemplary only, with a true scope and spirit of the disclosed embodiments being indicated by the following.

What is claimed is:

1. A composition comprising a cellulose ester; a secondary antioxidant in the range of from 0.1 to 0.8 wt %; an acid scavenger in the range of from 0.2 to 1.0 wt %; and a salt stabilizer in the range of from 0.01 to 0.1 wt %;
    wherein the cellulose ester is a cellulose acetate propionate,
    wherein the composition is plasticizer free,
    wherein the secondary antioxidant is an orpanophosphorous or orpanosulfur compound,
    wherein the acid scavenger is an epoxidized fatty acid ester,
    wherein the salt stabilizer is a compound wherein the cation component is aluminum, calcium, magnesium, copper, cerium, antimony, nickel, cobalt, manganese, barium, strontium, zinc, zirconium, tin, cadmium, chromium or iron, and the anion component is a $(C_{6-20})$ alicyclic carboxylic acid, a $(C_{2-20})$alkyl carboxylic acid, or a $(C_{6-20})$alkenyl carboxylic acid, wherein the $(C_{6-20})$alicyclic carboxylic acid, the $(C_{2-20})$alkyl carboxylic acid, or the $(C_{6-20})$alkenyl carboxylic acid is naphthenic acid, abietic acid, cyclohexane carboxylic acid, cyclohexane propionic acid, 3-methyl-cyclopentyl acetic acid, 4-methylcyclohexane carboxylic acid, 2,2,6-trimethylcyclohexane carboxylic acid, 2,3-dimethylcyclopentyl acetic acid, 2-methylcyclopentyl propionic acid, palmitic acid, stearic acid, oleic acid, or lauric acid,
    wherein the weight percentages of the cellulose ester, the secondary antioxidant, the acid scavenger, and the salt stabilizer are based on the total weight of the composition,
    wherein the composition has a heat distortion temperature ("HDT") that is in the range of from 95° C. to 140° C. according to ASTM D648 as measured at 1.82 MPa using a 3.2 mm thick bar subjected to 70° C. for 4 hours,
    wherein the change in the absolute weight average molecular weight ("$M_w$") of the cellulose ester due to injection molding is less than 30% when the composition is injection molded with a barrel temperature of 260° C. with a residence time of 5 min,
    wherein the b* value is less than 15 as measured according to ASTM E1348 using a 3.2 mm plaque made from the composition which has been injection molded with a barrel temperature of 249° C. with a residence time of 5 min.

2. The composition of claim 1, wherein the secondary antioxidant is 3,9-bis(2,4-di-tert-butylphenoxy)-2,4,8,10-tetraoxa-3,9-diphosphaspiro[5.5]undecane.

3. The composition of claim 1, wherein the composition further comprises an impact modifier in the range of from 0.1 to 15 wt % based on the total weight of the composition.

4. The composition of claim 1, the ΔE value is less than 25 wherein ΔE is determined by the following equation:

$$((L^*-100)^2+(a^*-0)^2+(b^*-0)^2)^{1/2}$$

and the L*, a*, b* values are determined according to ASTM E1348 using a 3.2 mm plaque made from the composition which has been injection molded with a barrel temperature of 249° C. with a residence time of 5 min.

5. The composition of claim 1, wherein the composition has a notched Izod impact strength of greater than 40 J/m as measured according to ASTM D256 using a 3.2 mm thick bar that has been subjected to 50% relative humidity for 48 hours at 23° C.

6. The composition of claim 1, wherein the composition has a flexural modulus of greater than 1800 MPa as measured according to ASTM D790 using a 3.2 mm thick bar that has been subjected to 50% relative humidity for 48 hours at 23° C.

7. The composition of claim 1, wherein the cellulose ester has an absolute weight average molecular weight in the range of from 40,000 Da to 200,000 Da measured according to ASTM D5296 using tetrahydrofuran as a solvent and a flow rate of 1 mL/min.

8. The composition of claim 1, wherein the spiral flow length is from 3.0 cm to 10.0 cm, when the composition is molded with a spiral flow mold with the conditions of a barrel temperature of 238° C., a melt temperature of 246° C., a molding pressure of 13.8 MPa, a mold thickness of 0.8 mm, and a mold width of 12.7 mm.

9. A molded article comprising the composition of claim 1.

* * * * *